United States Patent
Aso et al.

(10) Patent No.: US 8,149,807 B2
(45) Date of Patent: Apr. 3, 2012

(54) COMMUNICATION CONTROL METHOD, COMMUNICATION SYSTEM, HOME AGENT ALLOCATION SERVER, AND MOBILE NODE

(75) Inventors: Keigo Aso, Kanagawa (JP); Jun Hirano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 462 days.

(21) Appl. No.: 12/447,650

(22) PCT Filed: Nov. 1, 2007

(86) PCT No.: PCT/JP2007/071296
§ 371 (c)(1),
(2), (4) Date: Apr. 28, 2009

(87) PCT Pub. No.: WO2008/053954
PCT Pub. Date: May 8, 2008

(65) Prior Publication Data
US 2010/0061319 A1    Mar. 11, 2010

(30) Foreign Application Priority Data
Nov. 1, 2006  (JP) ................................ 2006-297835

(51) Int. Cl.
*H04W 4/00*    (2009.01)
(52) U.S. Cl. ................. 370/338; 709/227; 709/245
(58) Field of Classification Search .................. None
See application file for complete search history.

(56) References Cited

U.S. PATENT DOCUMENTS

| | | | |
|---|---|---|---|
| 6,560,217 B1 * | 5/2003 | Peirce et al. .................. 370/351 |
| 6,765,900 B2 * | 7/2004 | Peirce et al. .................. 370/351 |
| 7,319,673 B1 * | 1/2008 | Briscoe et al. ................ 370/252 |
| 7,343,158 B2 * | 3/2008 | Mizell et al. ................ 455/435.1 |
| 7,382,748 B1 * | 6/2008 | Bharatia et al. ............... 370/331 |
| 7,587,498 B2 * | 9/2009 | Leung et al. .................. 709/228 |
| 7,657,259 B2 * | 2/2010 | Yegani et al. ............... 455/432.1 |
| 2005/0020265 A1 | 1/2005 | Funabiki |
| 2007/0002787 A1 * | 1/2007 | Narayanan et al. ........... 370/328 |
| 2008/0040787 A1 | 2/2008 | Aso |

(Continued)

FOREIGN PATENT DOCUMENTS
JP      2004-007578       1/2004
(Continued)

OTHER PUBLICATIONS

G. Giaretta, et al., "Mobile IPv6 bootstrapping in split scenario draft-ietf-mip6-bootstrapping-split-02.txt," MIP6 WG, Internet Draft, Mar. 2006, pp. 1-33.

(Continued)

*Primary Examiner* — Robert Scheibel
(74) *Attorney, Agent, or Firm* — Dickinson Wright PLLC

(57) ABSTRACT

Disclosed is a technique for allowing a mobility service provider to allocate a home agent appropriate for each individual mobile node. According to the technique, an MN 10 notifies the domain name of an MSP 3 to an ASP 1, and in response to the notified domain name of the MSP, the ASP notifies the address of an HA allocation server 3a to the MN. The MN transmits, to the notified address of the HA allocation server, an HA allocation request message including the domain name of the ASP. The HA allocation server selects an HA based on previously held correspondences between HAs 3b, 3c and one or more ASPs, and notifies the selected HA to the MN.

8 Claims, 21 Drawing Sheets

U.S. PATENT DOCUMENTS

2008/0069030 A1    3/2008    Hirano
2009/0019180 A1    1/2009    Aso

FOREIGN PATENT DOCUMENTS

| | | |
|---|---|---|
| JP | 2005-253024 | 9/2005 |
| JP | 2006-114946 | 4/2006 |
| JP | 2006-203581 | 8/2006 |
| WO | 2005/117367 | 12/2005 |
| WO | 2006/035871 | 4/2006 |
| WO | 2006/106712 | 10/2006 |

OTHER PUBLICATIONS

K. Chowdhury, et al., "MIP6-bootstrapping for the Integrated Scenario draft-ietf-mip6-bootstrapping-integrated-06.txt," Network Working Group, Internet-Draft, Intended status: Standards Track, Apr. 2008, pp. 1-22.

* cited by examiner

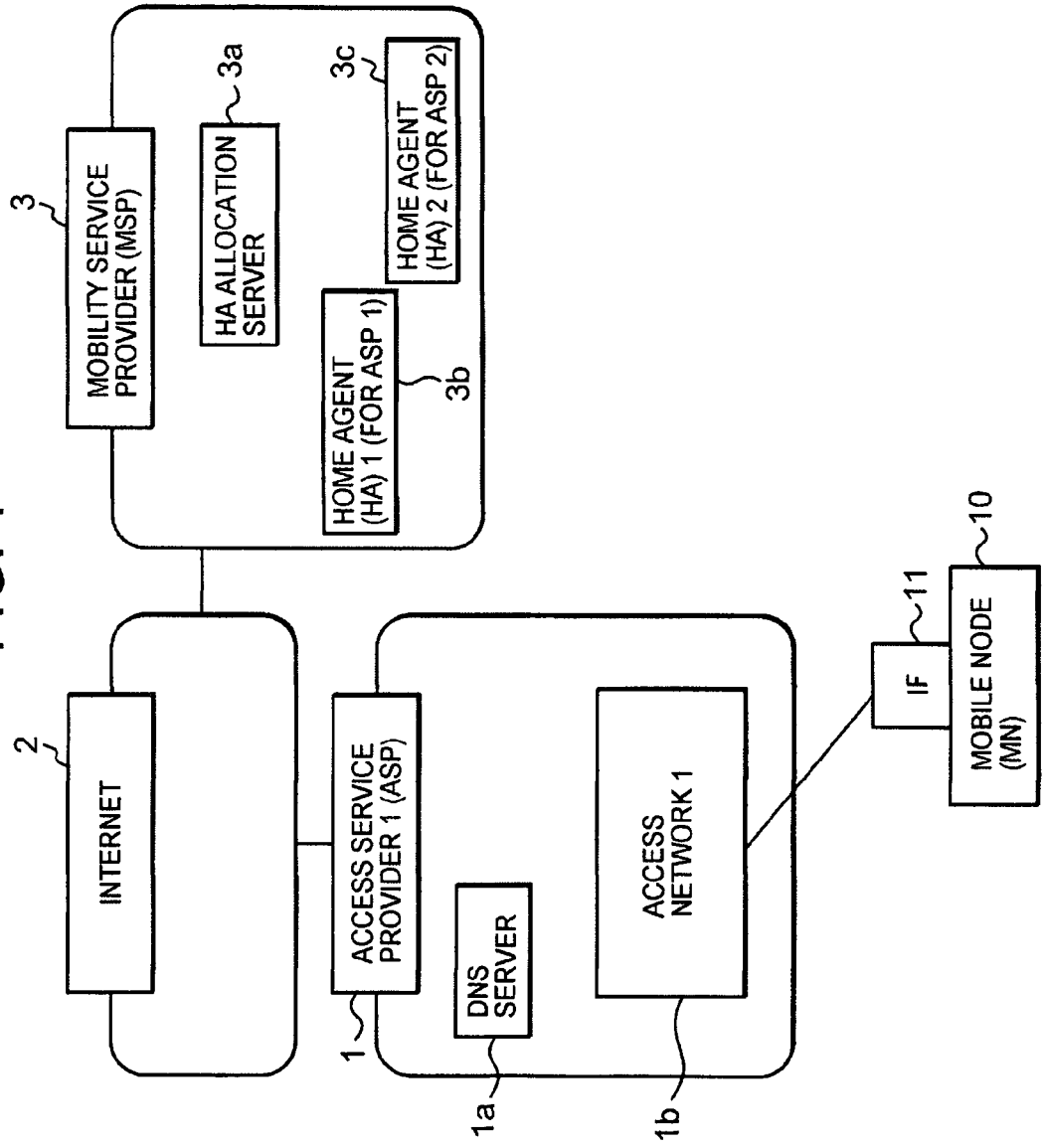

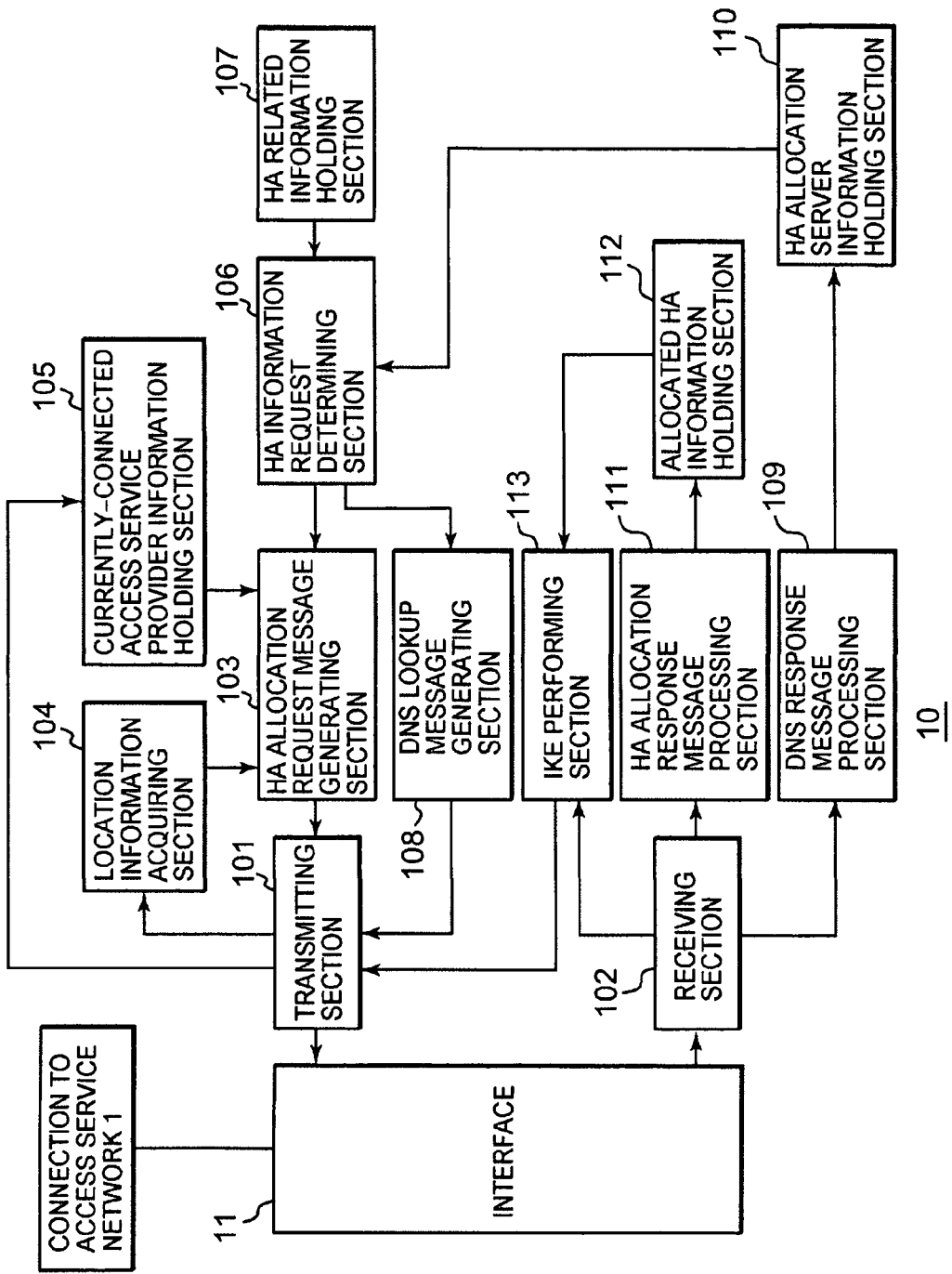

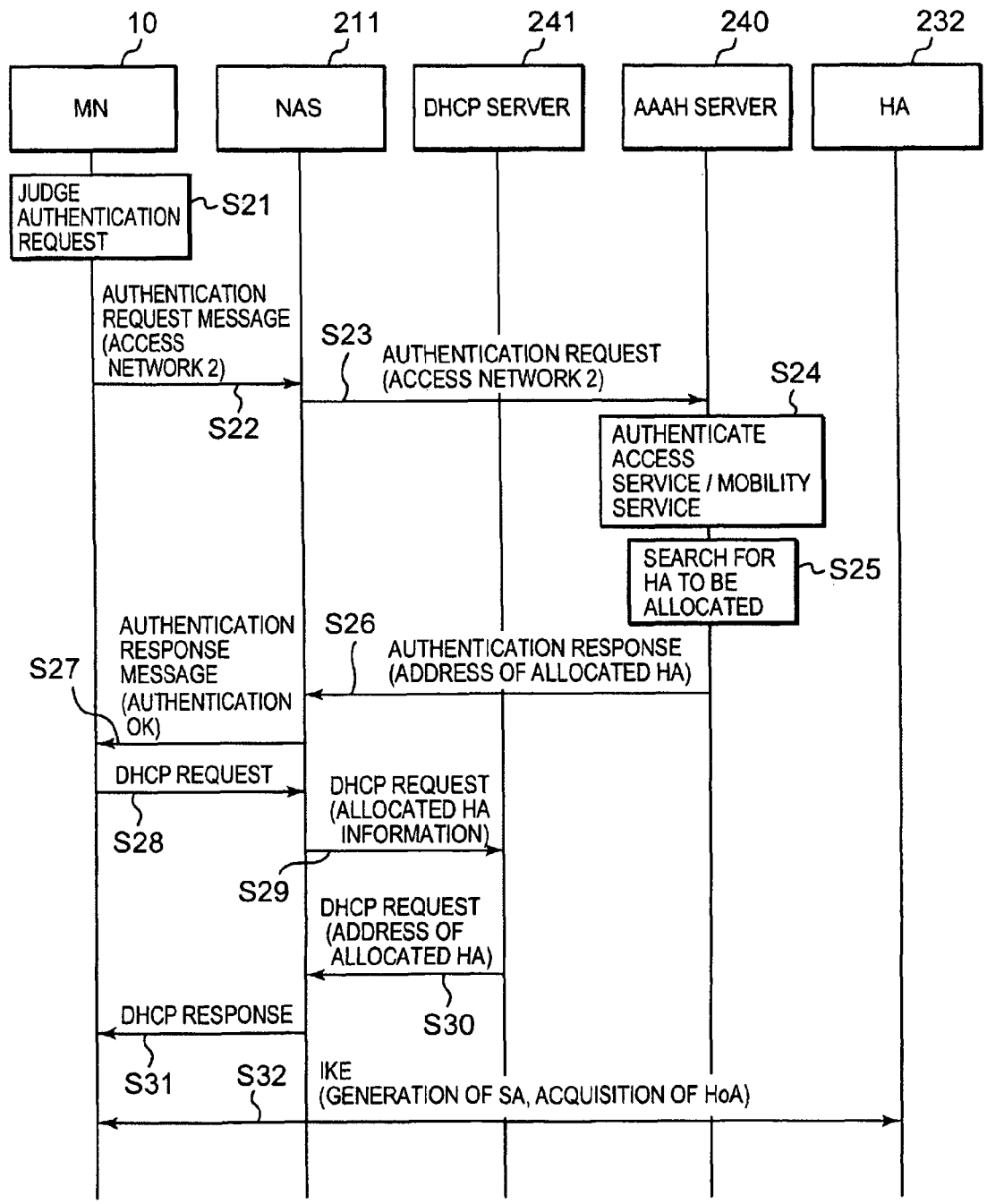

COMMUNICATION CONTROL METHOD, COMMUNICATION SYSTEM, HOME AGENT ALLOCATION SERVER, AND MOBILE NODE

TECHNICAL FIELD

The present invention relates to a communication control method in which a mobile node acquires a home address from a home agent, a communication system, a home agent allocation server, and a mobile node.

BACKGROUND ART

A mobile node (hereinafter, MN) using a mobile IP (Internet Protocol) requires a home agent (hereinafter, HA) for mobility management of itself. The MN notifies new location information to its HA and requests forwarding of packets destined to a home address (HoA). This HA is provided by a provider (hereinafter, a mobility service provider: MSP) to which the MN belongs and by which a mobility service is provided. Information related to the HA used by the MN is statically or dynamically configured for the MN. In the case of static configuration, there is a method of prerecording the information in the MN, or a method of allowing a user or a person on the MSP side to manually configure the information. On the other hand, in the case of dynamic configuration, it is allocated or searched for by an HA allocation request or an HA search request transmitted from the MN to the MSP side. Especially, the technique for dynamic configuration has drawn attention because the dynamic configuration allows the HA used by the MN to have more room for choice than the static configuration.

At present, the MIP6 Working Group of IETF (Internet Engineering Task Force) is considering some techniques for dynamically acquiring HA information (address of HA, etc.) based on information related to the HA previously held by the MN while minimizing the information related to the HA. Among the techniques, a so-called bootstrapping method for acquiring HA information (IP address of HA) using name resolution via a DNS (Domain Name System) is described in the following Non-Patent Document 1 as a technique used in a case where a provider providing an access service (hereinafter, access service provider: ASP) is different from the MSP (hereinafter, a split case).

Non-Patent Document 1: G. Giaretta, J. Kempf, and V. Devarapalli, "Mobile IPv6 bootstrapping in split scenario," draft-ietf-mip6-bootstrapping-split-02.txt, March 2006.

However, provided by the technique described in Non-Patent Document 1 is a method for allowing the MN to search for HA information, and a method for allowing the provider to dynamically allocate any HA information to the MN is not shown. According to this split case technique, the MSP cannot select an appropriate HA capable of making a determination based on a connection point (location information) of the MN because the MSP does not know the location of the MN. Therefore, the MN looks up an address corresponding to HA related information (domain name of MSP, etc.) previously held by itself using an existing DNS lookup to acquire the address of an HA. In other words, the HA information that the MN can know is searched by the MN, and it is not an HA arbitrarily selected by the MSP to allocate it to a specific MN. For this reason, the MSP cannot allocate an HA appropriate for each individual MN (i.e., it cannot allocate an HA that considers location information and the like of the MN). As a result, a case can occur, where the MN cannot help using an HA existing in a location which could be disadvantageous on a route. For example, when the MN has to use an HA far from a gateway of an ASP to which the MN is being connected, the forwarding route becomes long, and this has an effect such as a packet delay. Particularly, from a world-wide standpoint, an impact caused by such an HA allocation is significant.

When an MN having plural interfaces searches for an HA from a connected interface on behalf of another interface that is not connected to an access network, the MSP cannot, of course, allocate an HA appropriate for each individual MN (i.e., it cannot allocate an HA that considers location information and the like of the unconnected interface of the MN).

DISCLOSURE OF THE INVENTION

The present invention has been made in view of the problems with the above-mentioned conventional technique, and it is an object thereof to provide a communication control method, a communication system, a home agent allocation server, and a mobile node, which enables a mobility service provider (MSP) to allocate a home agent (HA) appropriate for each individual mobile node (MN), and hence to prevent a route between the mobile node (MN) and the home agent (HA) from becoming long and taking a long detour.

In order to attain the above object, according to the present invention, there is provided a communication control method of causing a mobile node to acquire a home address from a home agent in a communication system having one or more home agents provided in a first provider providing a mobility service and a home agent allocation server provided in the first provider or a second provider providing an access service, the communication control method including:

a step of causing the home agent allocation server to hold, in advance, correspondences between the one or more home agents and one or more second providers;

a step of causing the mobile node to transmit, to an address of the home agent allocation server, a home agent allocation request message including identification information of a second provider; and a step of causing the home agent allocation server to select a home agent based on the previously held correspondences between the home agents and the one or more second providers in response to the home agent allocation request message including the identification information of the second provider and notify the selected home agent to the mobile node, wherein the mobile node acquires a home address from the notified home agent.

The above-mentioned method enables a mobility service provider (MSP) to allocate a home agent (HA) appropriate for each individual mobile node (MN).

In order to attain the above object, according to the present invention, there is also provided a communication system having one or more home agents provided in a first provider providing a mobility service and a home agent allocation server provided in the first provider or a second provider providing an access service, and causing a mobile node to acquire a home address from a home agent, the communication system including:

means for causing the home agent allocation server to hold, in advance, correspondences between the one or more home agents and one or more second providers;

means for causing the mobile node to transmit, to an address of the home agent allocation server, a home agent allocation request message including identification information of a second provider; and means for causing the home agent allocation server to select a home agent based on the previously held correspondences between the home agents and the one or more second providers in response to the home agent allocation request message including the identification information of the second provider and notify the selected home agent to the mobile node, wherein the mobile node acquires a home address from the notified home agent.

The above-mentioned configuration enables a mobility service provider (MSP) to allocate a home agent (HA) appropriate for each individual mobile node (MN).

Further, in order to attain the above object, according to the present invention, there is provided a home agent allocation server in a communication system having one or more home agents provided in a first provider providing a mobility service and the home agent allocation server provided in the first provider or a second provider providing an access service, and causing a mobile node to acquire a home address from a home agent, the home agent allocation server including:

means for holding, in advance, correspondences between the one or more home agents and one or more second providers; and means which, when the mobile node transmits, to an address of the home agent allocation server, a home agent allocation request message including identification information of a second provider, selects a home agent based on the previously held correspondences between the home agents and the one or more second providers in response to the home agent allocation request message including the identification information of the second provider, and notifies the selected home agent to the mobile node, wherein the mobile node acquires a home address from the notified home agent.

The above-mentioned configuration enables a mobility service provider (MSP) to allocate a home agent (HA) appropriate for each individual mobile node (MN).

Further, in order to attain the above object, according to the present invention, there is provided a mobile node in a communication system having one or more home agents provided in a first provider providing a mobility service and a home agent allocation server provided in the first provider or a second provider providing an access service, and causing the mobile node to acquire a home address from a home agent, in which the home agent allocation server holds, in advance, correspondences between the one or more home agents and one or more second providers, the mobile node including:

means for transmitting, to an address of the home agent allocation server, a home agent allocation request message including identification information of a second provider; and means for acquiring a home address from a notified home agent when the home agent allocation server selects the home agent based on the previously held correspondences between the home agents and the one or more second providers in response to the home agent allocation request message including the identification information of the second provider and notifies the selected home agent to the mobile node.

The above-mentioned configuration enables a mobility service provider (MSP) to allocate a home agent (HA) appropriate for each individual mobile node (MN).

Further, in order to attain the above object, according to the present invention, there is provided a communication control method of causing a mobile node to acquire a home address from a home agent in a communication system having one or more home agents provided in a first provider providing a mobility service and a home agent allocation server provided in the first provider or a second provider providing an access service, in which the mobile node has plural interfaces respectively connectable to plural second providers, the communication control method including:

a step of causing the home agent allocation server to hold, in advance, correspondences between the one or more home agents and the plural second providers;

a step of causing the mobile node to notify identification information of the first provider to a second provider corresponding to a connectable interface among the plural interfaces;

a step of causing the second provider to notify the mobile node of an address of the home agent allocation server in response to the notified identification information of the first provider;

a step of causing the mobile node to transmit, to the notified address of the home agent allocation server, a home agent allocation request message including identification information of a second provider corresponding to an unconnectable interface among the plural interfaces; and a step of causing the home agent allocation server to select a home agent of the second provider corresponding to the unconnectable interface based on the previously held correspondences between the home agents and the plural second providers in response to the home agent allocation request message, and notify the selected home agent to the mobile node, wherein when the second provider corresponding to the unconnectable interface becomes connectable, the mobile node acquires a home address from the notified home agent.

The above-mentioned method enables allocation of a home agent (HA) of an access service provider to which a mobile node (MN) is currently unconnectable.

Further, in order to attain the above object, according to the present invention, there is provided a communication system having one or more home agents provided in a first provider providing a mobility service and a home agent allocation server provided in the first provider or a second provider providing an access service, in which a mobile node has plural interfaces respectively connectable to plural second providers and acquires a home address from a home agent, the communication system including:

means for causing the home agent allocation server to hold, in advance, correspondences between the one or more home agents and the plural second providers;

means for causing the mobile node to notify identification information of the first provider to a second provider corresponding to a connectable interface among the plural interfaces;

means for causing the second provider to notify the mobile node of an address of the home agent allocation server in response to the notified identification information of the first provider;

means for causing the mobile node to transmit, to the notified address of the home agent allocation server, a home agent allocation request message including identification information of a second provider corresponding to an unconnectable interface among the plural interfaces; and means for causing the home agent allocation server to select a home agent of the second provider corresponding to the unconnectable interface based on the previously held correspondences between the home agents and the plural second providers in response to the home agent allocation request message, and notify the selected home agent to the mobile node, wherein when the second provider corresponding to the unconnectable interface becomes connectable, the mobile node acquires a home address from the notified home agent.

The above-mentioned configuration enables allocation of a home agent (HA) of an access service provider to which a mobile node (MN) is currently unconnectable.

Further, in order to attain the above object, according to the present invention, there is provided a home agent allocation server in a communication system having one or more home agents provided in a first provider providing a mobility service and the home agent allocation server provided in the first provider or a second provider providing an access service, in which a mobile node has plural interfaces respectively connectable to plural second providers and acquires a home address from a home agent, the home agent allocation server including:

means for holding, in advance, correspondences between the one or more home agents and the plural second providers; and means for selecting a home agent of a second provider corresponding to an unconnectable interface based on the previously held correspondences between the home agents and the plural second providers in response to a home agent allocation request message, and notifying the selected home agent to the mobile node when the mobile node notifies identification information of the first provider to a second provider corresponding to a connectable interface among the plural interfaces, the second provider notifies the mobile node of an address of the home agent allocation server in response to the notified identification information of the first provider, and the mobile node transmits, to the notified address of the home agent allocation server, the home agent allocation request message including identification information of the second provider corresponding to the unconnectable interface among the plural interfaces, wherein when the second provider corresponding to the unconnectable interface becomes connectable, the mobile node acquires a home address from the notified home agent.

The above-mentioned configuration enables allocation of a home agent (HA) of an access service provider to which a mobile node (MN) is currently unconnectable.

Further, in order to attain the above object, according to the present invention, there is provided a mobile node in a communication system having one or more home agents provided in a first provider providing a mobility service and a home agent allocation server provided in the first provider or a second provider providing an access service, in which the mobile node has plural interfaces respectively connectable to plural second providers, the home agent allocation server holds, in advance, correspondences between the one or more home agents and the plural second providers, and the mobile node acquires a home address from a home agent, the mobile node including:

means for notifying identification information of the first provider to a second provider corresponding to a connectable interface among the plural interfaces;

means for transmitting, to a notified address of the home agent allocation server, a home agent allocation request message including identification information of a second provider corresponding to an unconnectable interface among the plural interfaces when the second provider notifies the mobile node of the address of the home agent allocation server in response to the notified identification information of the first provider; and means for acquiring a home address from a notified home agent when the second provider corresponding to the unconnectable interface becomes connectable after the home agent allocation server selects the home agent of the second provider corresponding to the unconnectable interface based on the previously held correspondences between the home agents and the plural second providers in response to the home agent allocation request message, and notifies the mobile node of the selected home agent.

The above-mentioned configuration enables allocation of a home agent (HA) of an access service provider to which a mobile node (MN) is currently unconnectable.

Further, in order to attain the above object, according to the present invention, there is provided a communication control method of causing a mobile node to acquire a home address from a home agent in a communication system, in which a provider serving as both a first provider providing a mobility service and a second provider providing an access service has one or more home agents, one or more access networks, and a home agent allocation server, and the mobile node has plural interfaces respectively connectable to the plural access networks, the communication control method including:

a step of causing the home agent allocation server to hold, in advance, correspondences between the one or more home agents and the one or more access networks;

a step of causing the mobile node to transmit an authentication request for a second access network corresponding to an unconnectable interface to the home agent allocation server through a first access network corresponding to a connectable interface among the plural interfaces; and a step of causing the home agent allocation server to authenticate the authentication request, select a home agent corresponding to the second access network based on the previously held correspondences between the home agents and the one or more access networks, and notify the selected home agent to the mobile node, wherein when the second access network becomes connectable, the mobile node acquires a home address from the notified home agent.

The above-mentioned method enables allocation of a home agent (HA) of an access service provider to which a mobile node (MN) is currently unconnectable when a provider serves as both a mobility service provider and the access service provider.

Further, in order to attain the above object, according to the present invention, there is provided a communication system, in which a provider serving as both a first provider providing a mobility service and a second provider providing an access service has one or more home agents, one or more access networks, and a home agent allocation server, and a mobile node has plural interfaces respectively connectable to the plural access networks and acquires a home address from a home agent, the communication system including:

means for causing the home agent allocation server to hold, in advance, correspondences between the one or more home agents and the one or more access networks;

means for causing the mobile node to transmit an authentication request for a second access network corresponding to an unconnectable interface to the home agent allocation server through a first access network corresponding to a connectable interface among the plural interfaces; and means for causing the home agent allocation server to authenticate the authentication request, select a home agent corresponding to the second access network based on the previously held correspondences between the home agents and the one or more access networks, and notify the selected home agent to the mobile node, wherein when the second access network becomes connectable, the mobile node acquires a home address from the notified home agent.

The above-mentioned configuration enables allocation of a home agent (HA) of an access service provider to which a mobile node (MN) is currently unconnectable when a provider serves as both a mobility service provider and the access service provider.

Further, in order to attain the above object, according to the present invention, there is provided a home agent allocation server in a communication system, in which a provider serving as both a first provider providing a mobility service and a second provider providing an access service has one or more home agents, one or more access networks, and the home agent allocation server, and the mobile node has plural interfaces respectively connectable to the plural access networks and acquires a home address from a home agent, the home agent allocation server including:

means for holding, in advance, correspondences between the one or more home agents and the one or more access networks; and means which, when the mobile node transmits an authentication request for a second access network corresponding to an unconnectable interface to the home agent allocation server through a first access network corresponding to a connectable interface among the plural interfaces, authenticates the authentication request, selects a home agent corresponding to the second access network based on the previously held correspondences between the home agents and the one or more access networks, and notifies the selected home agent to the mobile node, wherein when the second access network becomes connectable, the mobile node acquires a home address from the notified home agent.

The above-mentioned configuration enables allocation of a home agent (HA) of an access service provider to which a mobile node (MN) is currently unconnectable when a provider serves as both a mobility service provider and the access service provider.

Further, in order to attain the above object, according to the present invention, there is provided a mobile node in a communication system, in which a provider serving as both a first provider providing a mobility service and a second provider providing an access service has one or more home agents, one or more access networks, and a home agent allocation server, the mobile node has plural interfaces respectively connectable to the plural access networks and acquires a home address from a home agent, and the home agent allocation server holds, in advance, correspondences between the one or more home agents and the one or more access networks, the mobile node including:

means for transmitting an authentication request for a second access network corresponding to an unconnectable interface to the home agent allocation server through a first access network corresponding to a connectable interface among the plural interfaces; and means for acquiring a home address from a notified home agent when the second access network becomes connectable after the home agent allocation server authenticates the authentication request, selects the home agent corresponding to the second provider based on the previously held correspondences between the home agents and the one or more access networks, and notifies the selected home agent to the mobile node.

The above-mentioned configuration enables allocation of a home agent (HA) of an access service provider to which a mobile node (MN) is currently unconnectable when a provider serves as both a mobility service provider and the access service provider.

According to the present invention, the mobility service provider (MSP) can allocate a home agent (HA) appropriate for each individual mobile node (MN), and hence prevent a route between the mobile node (MN) and the home agent (HA) from becoming long and taking a long detour.

BRIEF DESCRIPTION OF THE DRAWINGS

[FIG. 1] It is a block diagram showing a network configuration according to a first embodiment of the present invention.

[FIG. 2] It is a block diagram showing, in detail, a configuration of a mobile node of FIG. 1.

[FIG. 25] It is an explanatory diagram showing a network communication sequence in the third embodiment.

BEST MODES FOR CARRYING OUT THE INVENTION

Figure 3A:
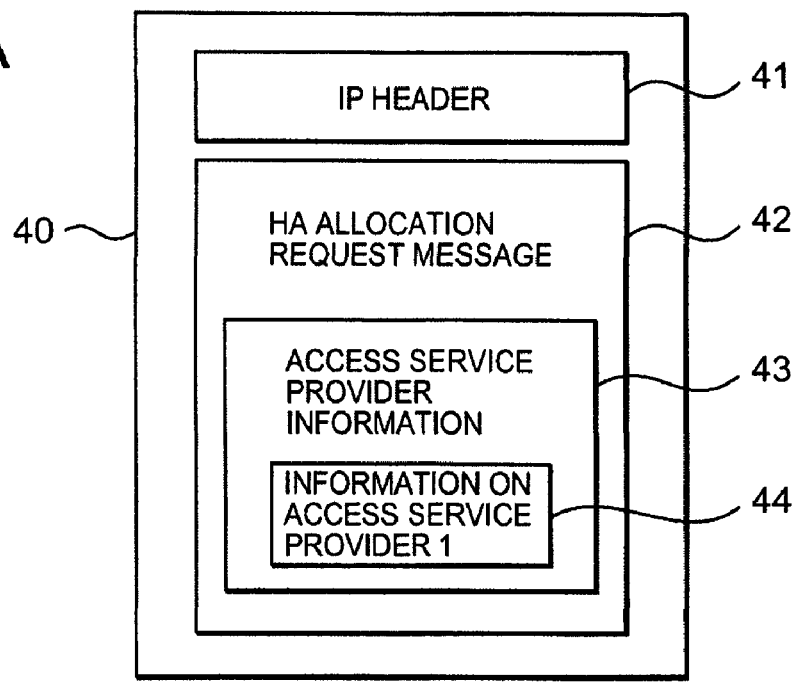
[FIG. 3A] It is an explanatory diagram showing a format example of an HA allocation request message in the first embodiment.

Embodiments of the present invention will be described below with reference to the drawings.

Here, the following describes the outline of first, second, and third embodiments.

<First Embodiment>: An HA allocation server is used and the number of interfaces of an MN is one (IF 1).

(a) Initial information: IP address of HA allocation server and domain name of MSP.

(b) Message: HA allocation request message (Msg), Destination: HA allocation server.
  (1) Includes the domain name of an ASP to which the IF 1 is being connected.
  (2) Includes location information such as specification of Local or Network Realm, and GPS (Global Positioning System).

Modification of the first embodiment: A DNS is used as the HA allocation server.
  (c) Initial information: Domain name of MSP.
  (d) DNS lookup Msg, Destination: DNS server.
  (1) Includes the domain name of an ASP to which the IF 1 is being connected.

Modification of the first embodiment: DHAAD, IKEv2, or the like is used.
  (e) Initial information: HA anycast address and domain name of MSP.
  (f) DHAAD request Msg, Destination: HA anycast address.
  (1) Includes the domain address of an ASP to which the IF 1 is being connected.

<Second Embodiment>: The HA allocation server is used, and the number of interfaces of the MN is plural (IF 1, IF 2).

(g) Initial information: IP address of HA allocation server and domain name of MSP.

(h) Message: HA allocation request Msg, Destination: HA allocation server.
  (1) Includes the domain name of an ASP to which the IF 2 is connectable.

Modification of the second embodiment: The DNS is used as the HA allocation server.
  (i) Initial information: Domain name of MSP.
  (j) DNS lookup Msg, Destination: DNS server.
  (1) Includes the domain name of an ASP to which the IF 2 is connectable.

Modification of the second embodiment: DHAAD, IKEv2, or the like is used.
  (k) Initial information: HA anycast address and domain name of MSP.
  (l) DHAAD request Msg, Destination: HA anycast address.
  (1) Includes the domain name of an ASP to which the IF 2 is connectable.
  (2) Includes location information such as the specification of Local or Network Realm, and GPS.

<Third Embodiment>: In the case of an integrated scenario (the mobility service provider and the access service provider are identical). The IF of the MN is both single/multiple.
  (m) initial information: Domain name of MSP.
  (n) Authentication request Msg, DHCP request Msg, Destination:
  (1) Includes the domain name of an ASP to which the IF 1 is being connected.
  (2) Includes the domain name of an ASP to which the IF 2 is connectable.
  (3) Includes location information such as the specification of Local or Network Realm, and GPS.

<First Embodiment>

The first embodiment will be described in detail below. In the first embodiment, the MN is a single interface node, and the HA allocation server is introduced. The address of the HA allocation server is registered in the DNS. The MN may statically know information related to the HA allocation server. Access service provider information is notified.

FIG. 1 is a diagram showing a network configuration according to the first embodiment of the present invention. An access service provider (ASP) 1 is a provider providing an MN (Mobile Node) 10 with an access service to the Internet 2, providing a DNS server 1a and an access network 1b (access network 1) as a network to which the MN 10 is connectable. A mobility service provider (MSP) 3 is a provider providing the MN 10 with a mobility service, having an HA allocation server 3a, plural HAs 3b (home agent 1 (for ASP 1)) and 3c (home agent 2 (for ASP 2)) for mobility management of the MN 10. The MN 10 is provided with one interface 11 (IF), and the interface 11 is connected to the access network 1b. The access service provider according to the first embodiment of the present invention is a cellular operator providing cellular networks, an Internet service provider providing hot spot or the like for connection to the Internet, or the like. The mobility service provider may serve not only as the provider providing the mobility service, but also as the provider providing the access service.

FIG. 2 is a configuration example of the MN 10 according to the first embodiment of the present invention. The MN 10 has the interface 11, a transmitting section 101, a receiving section 102, an HA allocation request message generating section 103, a location information acquiring section 104, a currently-connected access service provider information holding section 105, an HA information request determining section 106, an HA related information holding section 107, a DNS lookup message generating section 108, a DNS response message processing section 109, an HA allocation server information holding section 110, an HA allocation response message processing section 111, an allocated HA information holding section 112, and an IKE performing section 113.

The interface 11 is connected to the access network (access network 1) 1b. The transmitting section 101 performs processing for transmission to the access network 1b, and the receiving section 102 performs processing for receiving from the access network 1b. The HA allocation request message generating section 103 receives an instruction from the HA information request determining section 106, generates an HA allocation request message 40, 40a (to be described later) with a passed address of the HA allocation server 3a as the destination, passes it to the transmitting section 101, and instructs the transmitting section 101 to transmit it. At this time, the currently-connected access service provider information holding section 105 is referred to include, in the message 40, 40a, ID information related to an ASP 1 (e.g., the domain name of the ASP 1) to which the MN 10 itself is currently being connected.

From a global perspective, it is preferable that the MN 10 should hold, as the domain name of the ASP 1, a domain name specified in such a manner that the top-level domain is identified by its country code top-level domain or generic top-level domain (e.g., "net") to enable an MSP 3 to distinguish it regionally or by category in order to make it possible for the MSP 3 to obtain a connection point of the MN 10 more accurately. In this case, the MN 10 needs to acquire a domain name corresponding to the access network 1b from the ASP 1 or to generate an appropriate domain name by itself based on information acquired from the ASP 1 in order to hold the domain name. Further, the MN 10 may use preset information, or hold ID information of an access provider (access network) to which it is connectable, and search the information to acquire a domain name of the network connected. For example, in the case of a global ASP, if the MN 10 is connected to the access network 1b provided in Japan, a domain name with a top-level domain of ".jp" is used, while if it is connected to the access network 1b provided in USA, a domain name with a top-level domain of ".us" is used, so that the MSP 3 can not only identify the ASP 1 to which the MN 10 is being connected, but also identify the geographic location of the access network 1b.

The HA allocation request message generating section 103 can also refer to the location information acquiring section 104 to acquire location information (GPS information or the like) of the MN 10 in order to include the location information in the message 40, 40a. In this case, both the ID information related to the ASP 1 and the location information may be included in the message 40, 40a, or either of them may be included. In addition to the above information, the HA allocation request message generating section 103 can also specify either "Local" or "Network" as a location where a desired HA 3b, 3c exists. In this case, in addition to the specification of "Local" or "Network," both or either of the ID information related to the ASP 1 and the location information may be included in the message 40, 40a. The location information acquiring section 104 provides current location information of the MN 10 to the HA allocation request message generating section 103. As the location information, for example, location information acquired using a GPS device, information acquired from the access network 1b connected (SSID of an access point connected, advertised prefix, etc.), or a MAC address related to the IF 11 or ID (MN-ID) of the MN 10 related to the IF 11 as information for specifying the interface connected to the access network 1b can be used.

Figure 3B:
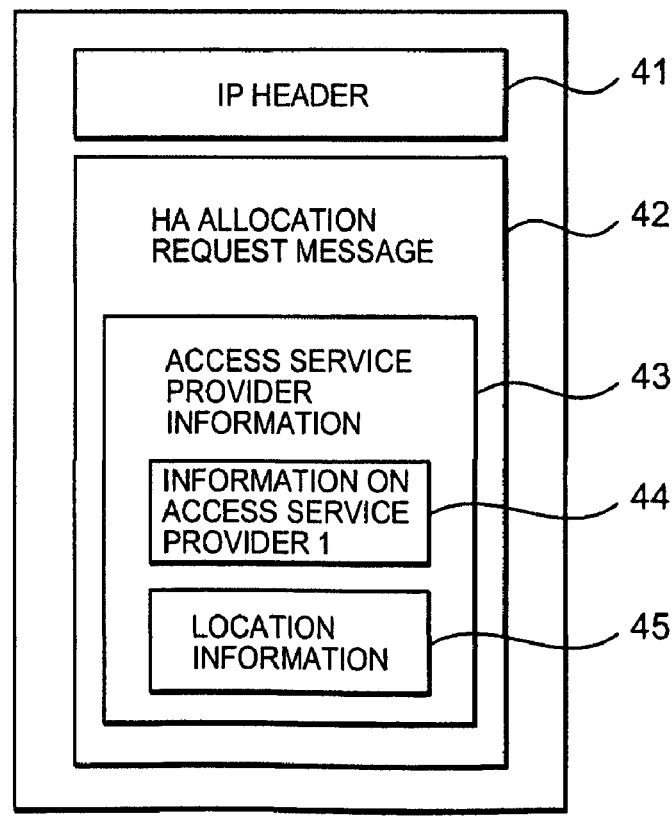
[FIG. 3B] It is an explanatory diagram showing a modification of FIG. 3A.
Figure 4A:
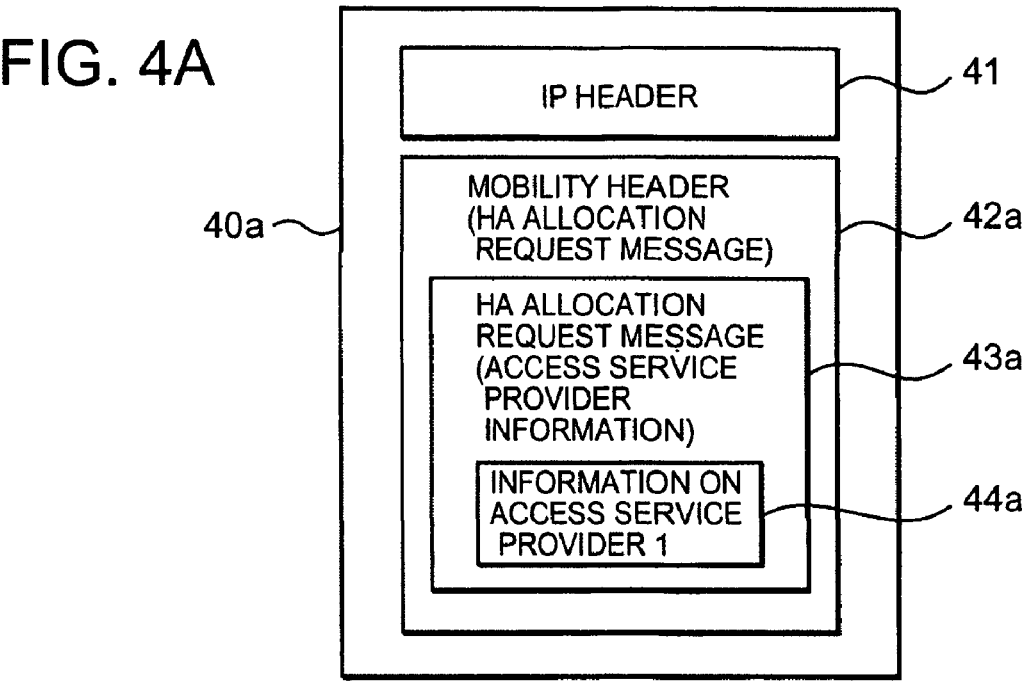
[FIG. 4A] It is an explanatory diagram showing another format example of the HA allocation request message in the first embodiment.
Figure 4B:
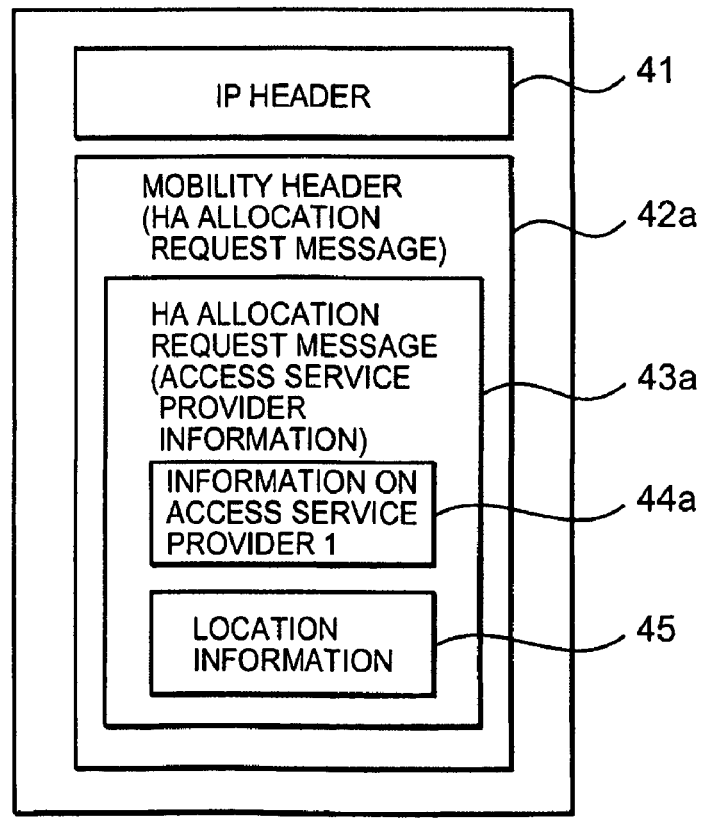
[FIG. 4B] It is an explanatory diagram showing a modification of FIG. 4A.

FIG. 3A is a format example of the HA allocation request message 40. The message 40 includes an IP header 41 followed by a value (42 in FIG. 3A and FIG. 3B) indicating that this is an HA allocation request message, and information 44 on the ASP 1 as access service provider information 43 to be notified. FIG. 3B shows a modification of FIG. 3A, adding location information 45 to FIG. 3A. FIG. 4A is a format example of an HA allocation request message 40a in the case of use of a mobility header. In the message 40a, a value (42a in FIG. 4A and FIG. 4B) indicative of the HA allocation request message is specified in a Type field of the mobility header, and inside the message 40a, information 44a on the ASP 1 is stored as access service provider information 43a to be notified. The information 44a on the ASP 1 may be included as a mobility option. FIG. 4B shows a modification of FIG. 4A, adding location information 45 to FIG. 4A.

Returning to FIG. 2, the currently-connected access service provider information holding section 105 holds information related to the ASP 1 to which the interface 11 is currently being connected or is connectable. As the acquisition method, preset information may be used, or the information may be acquired from the ASP 1 through the transmitting section 101. As the ID information related to the ASP 1, the domain name can be used, for example. The HA information request determining section 106 serves to start the operation of acquiring HA information at any timing. In the operation of acquiring HA information, the HA information request determining section 106 first refers to the HA related information holding section 107, passes HA related information (e.g., the domain name of the MSP 3) held therein to the DNS lookup message generating section 108, and instructs it to acquire an address. Further, the HA information request determining section 106 acquires the address of the HA allocation server 3a from HA allocation server information held by the HA allocation server information holding section 110, passes it to the HA allocation request message generating section 103, and instructs it to generate the HA allocation request message 40, 40a. The information passed to the DNS lookup message generating section 108 may be the FQDN (Fully Qualified Domain Name) of the HA allocation server 3a. Further, according to the rules of RFC2782, a value with a service name added to the domain name of the MSP 3 may be used.

The DNS lookup message generating section 108 receives an instruction from the HA information request determining section 106, generates a DNS lookup message including the passed domain name (the domain name of the MSP 3, service name+domain name, or the FQDN of the HA allocation server 3a), passes it to the transmitting section 101, and instructs it to transmit the DNS lookup message to the DNS server 1a, In this case, the MSP 3 needs to register with the DNS server 1a so that the address of the HA allocation server 3a can be searched for.

The DNS response message processing section 109 processes a DNS response message received from the DNS server 1a to acquire information on the HA allocation server 3a included in the message, passes the information to the HA allocation server information holding section 110, and instructs it to hold the information. The HA allocation server information holding section 110 holds the information on the HA allocation server 3a passed from the DNS response message processing section 109. The HA allocation response message processing section 111 processes an HA allocation response message 50, 50a (to be described later) received from the HA allocation server 3a to acquire allocated HA information included in the message 50, 50a, passes it to the allocated HA information holding section 112, and instructs the allocated HA information holding section 112 to hold it. The allocated HA information holding section 112 holds the allocated HA information passed from the HA allocation response message processing section 111.

Figure 5:
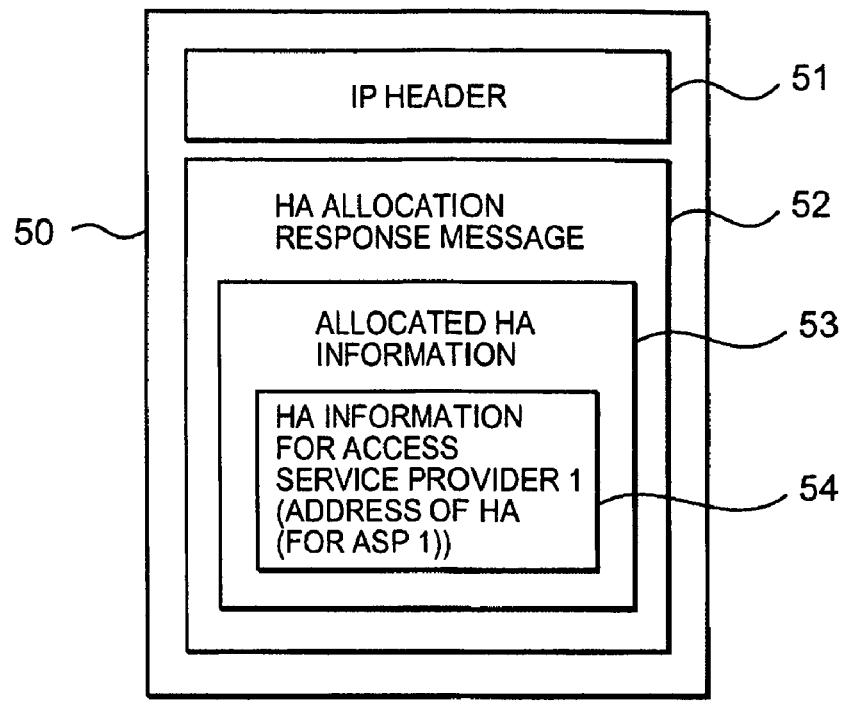
[FIG. 5] It is an explanatory diagram showing a format example of an HA allocation response message in the first embodiment.
Figure 6:
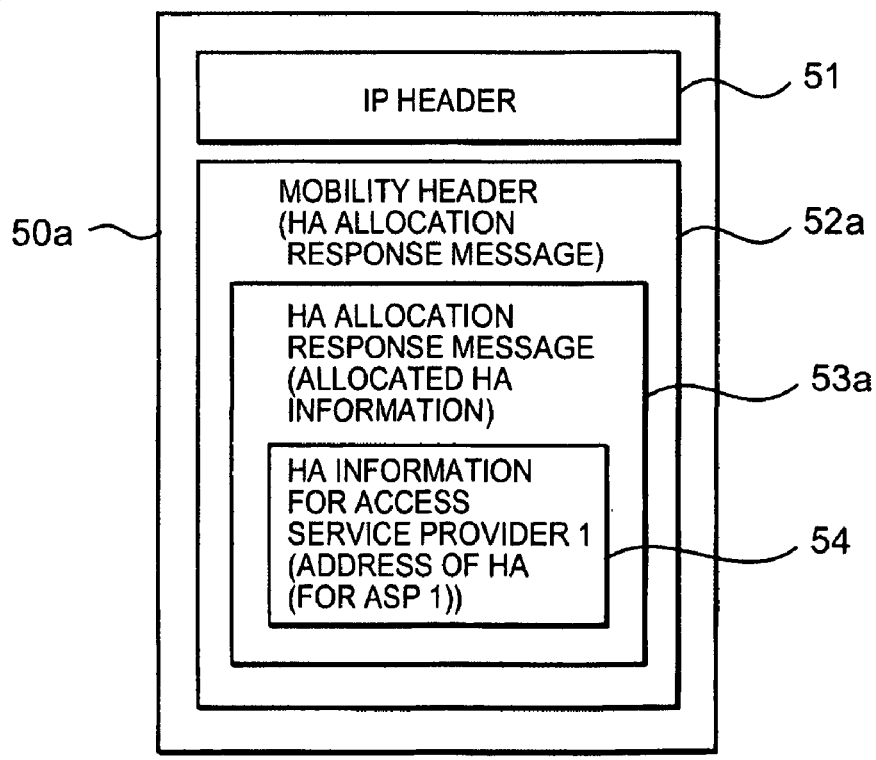
[FIG. 6] It is an explanatory diagram showing another format example of the HA allocation response message in the first embodiment.

FIG. 5 is a format example of the HA allocation response message 50. The response message 50 includes an IP header 51 followed by a value (52 in FIG. 5) indicating that this is the HA allocation response message 50, and information 54 (HA information for the access service provider 1) on the HA 3b for the ASP 1 as information 53 on the allocated HA. FIG. 6 is a format example of the HA allocation response message 50a in the case of use of a mobility header 52a, in which (value 53a in FIG. 6) indicative of the HA allocation response message is specified in a Type field of the mobility header 52a, and information 54 (HA information for the access service provider 1) on the HA 3a for the ASP 1 is stored inside the message 50a as information on the HA. The information 54 on the HA 3a for the ASP 1 may be included as a mobility option. Returning to FIG. 2, the IKE performing section 113 performs IKE (Internet Key Exchange) on the address of the allocated HA held in the allocated HA information holding section to generate SA (Security Association) and acquire HoA. If the MN 10 knows the address of the HA allocation server 3a beforehand, address search by the DNS may not need performing.

Figure 7:
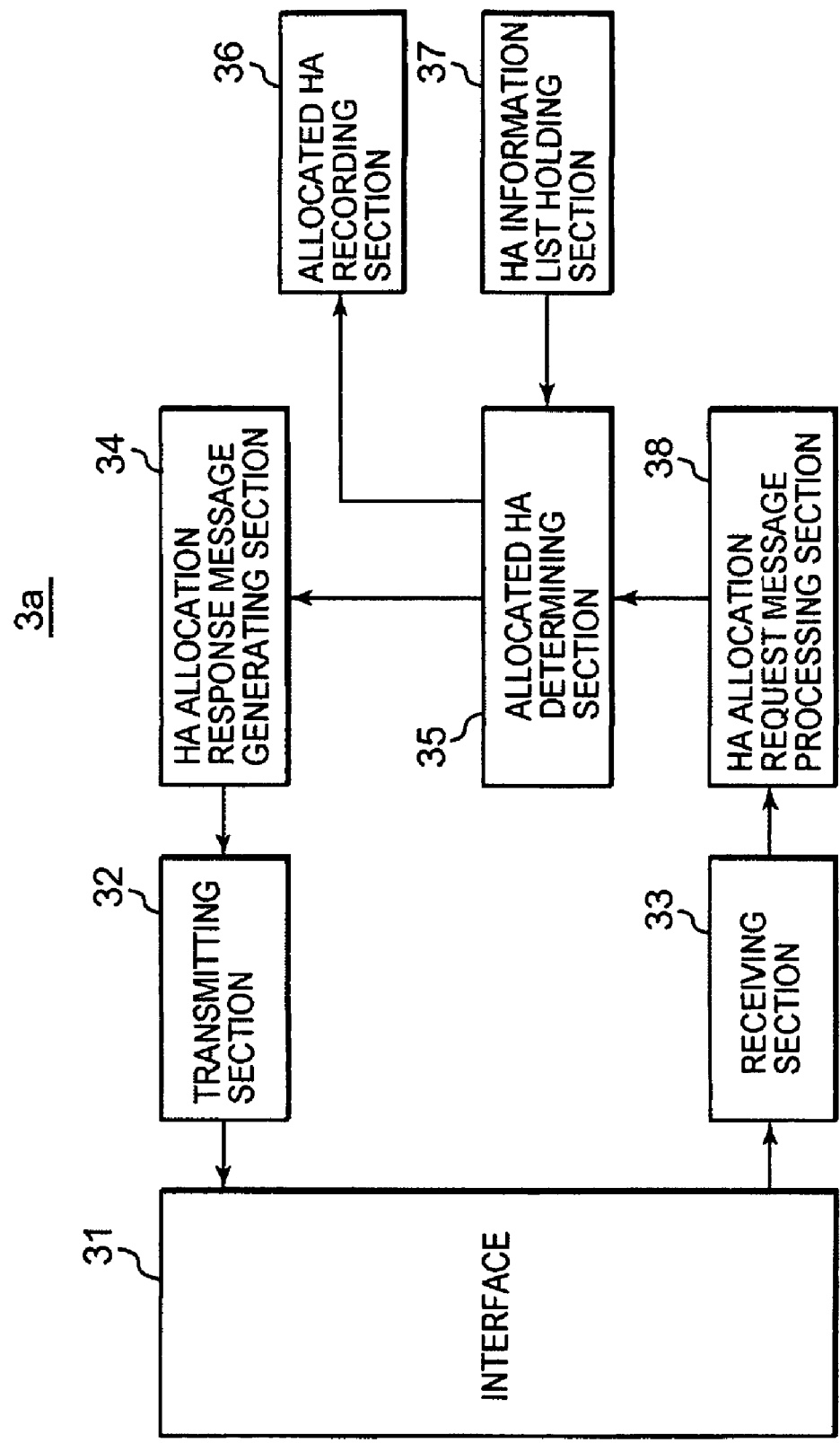
[FIG. 7] It is a block diagram showing, in detail, a configuration of an HA allocation server of FIG. 1.

FIG. 7 is a configuration example of the HA allocation server 3a according to the first embodiment of the present invention. The HA allocation server 3a has an interface 31, a transmitting section 32, a receiving section 33, an HA allocation response message generating section 34, an allocated HA determining section 35, an allocated HA recording section 36, an HA information list holding section 37, and an HA allocation request message processing section 38. The interface 31 is connected to the Internet 2. The transmitting section 32 performs processing for transmission to the Internet 2, and the receiving section 33 performs processing for receiving from the Internet 2. The HA allocation response message generating section 34 receives an instruction from the allocated HA determining section 35, generates the HA allocation response message 50 (FIG. 5), 50a (FIG. 6) including the passed HA information, passes it to the transmitting section 32, and instructs the transmitting section 32 to transmit it.

The allocated HA determining section 35 receives an instruction from the HA allocation request message processing section 38, refers to the HA information list holding section 37, and determines the HA 3b for the MN 10 belonging to the ASP 1 corresponding to the passed domain name. Further, the allocated HA determining section 35 passes the HA information to the allocated HA recording section 36 to request the allocated HA recording section 36 to record the HA information as the HA allocated to the MN 10, while the allocated HA determining section 35 passes it to and instructs the HA allocation response message generating section 34 to generate the HA allocation response message 50, 50a. The HA information list holding section 37 holds information (addresses of HAs) on plural HAs, i.e., HA 3b and HA 3c, provided by the MSP 3. The held HA information is associated with information on the access network 1b to which the MN 10 as the allocation target is connected.

Figure 8:
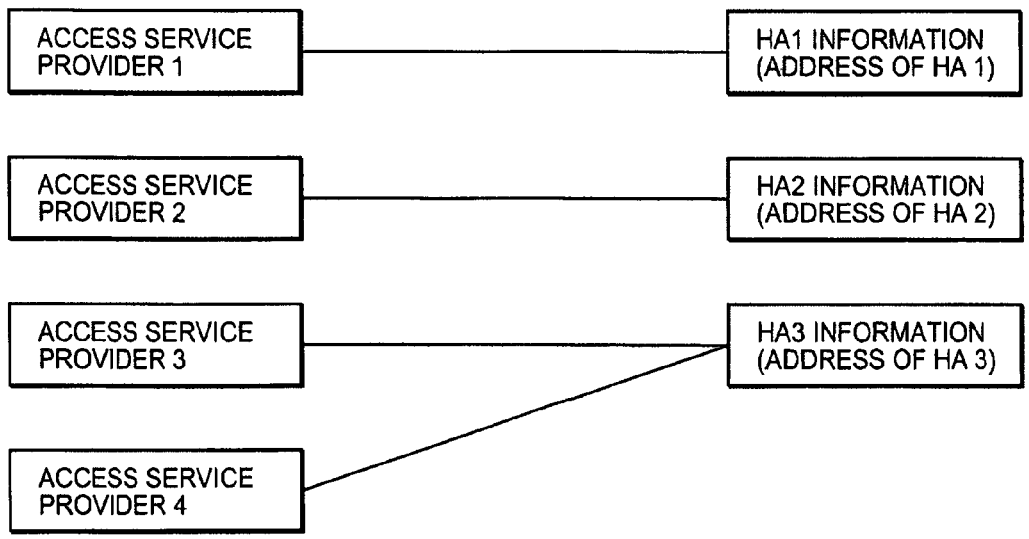
[FIG. 8] It is an explanatory diagram showing an example of data held by an HA information list holding section of FIG. 7.

FIG. 8 is a first example of the HA information held by the HA information list holding section 37. HA1 information (address of HA 1), HA2 information (address of HA 2), and HA3 information (address of HA 3) as respective pieces of HA information are associated with ASPs (access service providers 1, 2, 3, and 4), so that an associated HA is allocated to an MN connected to a specified ASP. For example, HA 1 is allocated to an MN connected to the access service provider 1. Further, as shown in FIG. 8, it is possible to associate two access service providers 3 and 4 with the same HA 3. As the method of associating an HA with any ASP, it can be considered a method of associating an appropriate HA according to, for example, the operating scale of the ASP or the number of users, or the type of service.

Figure 9:
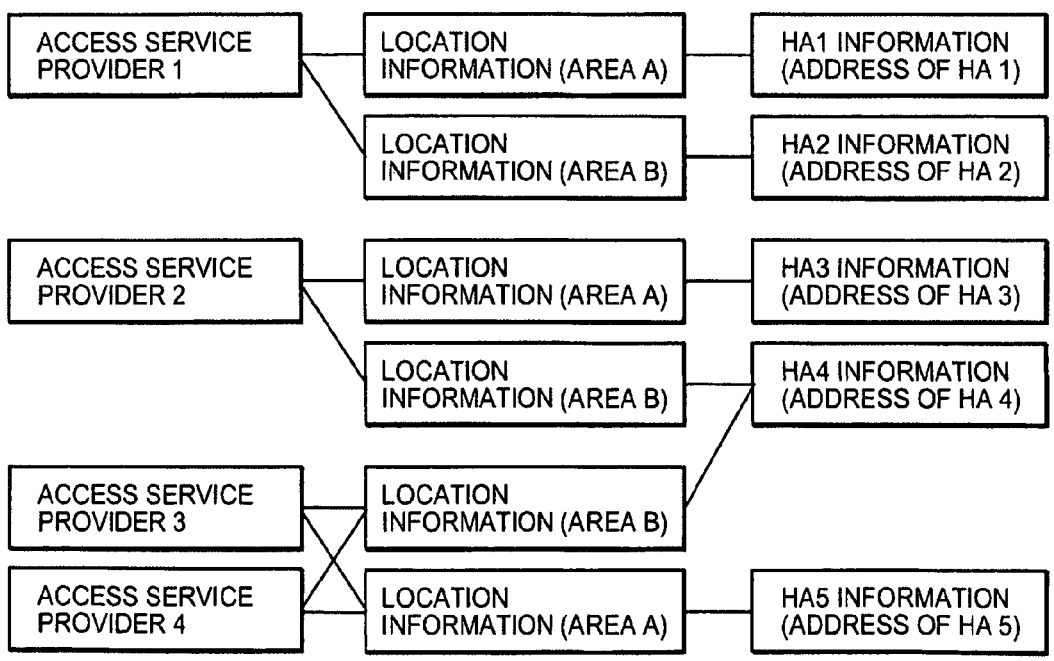
[FIG. 9] It is an explanatory diagram showing another example of data held by the HA information list holding section of FIG. 7.

FIG. 9 is a second example of the HA information held by the HA information list holding section 37. HA1 information (address of HA 1), HA2 information (address of HA 2), HA3 information (address of HA 3), HA4 information (address of HA 4), and HA5 information (address of HA5) as respective pieces of HA information are associated with location information (area information A and B) and ASPs (access service providers 1, 2, 3, and 4), so that an HA to be finally allocated is selected in consideration of an ASP to which the MN is connected and the location information. For example, HA 4 is allocated to an MN connected to the access service provider 2 and whose location information belongs to area B.

Returning to FIG. 7, the allocated HA recording section 36 receives an instruction from the allocated HA determining section 35 to record a condition of HA allocation to the MN 10. The HA allocation condition may be held by the HA information list holding section 37. The HA allocation request message processing section 38 processes the HA allocation request message 40 (FIG. 3), 40a (FIG. 4) received from the MN 10, acquires the domain name of the ASP 1 included in the message 40, 40a, passes it to the allocated HA determining section 35, and instructs it to determine an HA to be allocated. If the location information of the MN 10 is included in the received HA allocation request message 40, 40a, an HA located near the MN 10 can be selected based on the location information, or both the location information and the domain name of the ASP 1 can be used to select an HA, which is for the ASP 1 connected with the MN 10, and is located near the MN. Further, if "Local" is specified in the received HA allocation request message 40, 40a, it can be determined that an HA existing in a "Local" area as seen from the location information of the MN 10 is selected, while if "Network" is specified, it can be determined that an HA existing in a "Network" area as seen from the location information of the MN 10 is selected.

Figure 10:
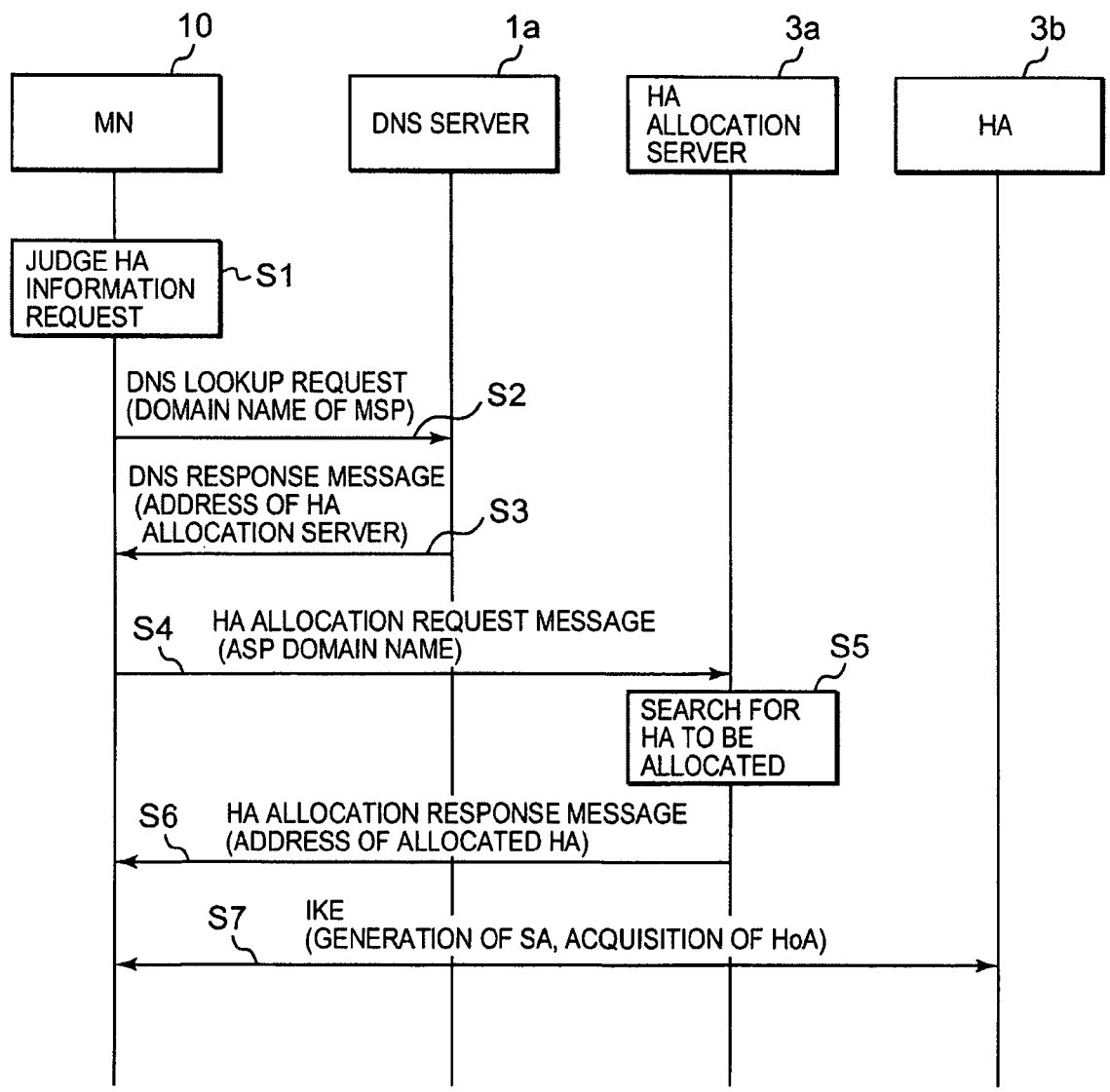
[FIG. 10] It is an explanatory diagram showing a network communication sequence in the first embodiment.

FIG. 10 is an explanatory diagram showing a network communication sequence according to the first embodiment of the present invention. If determining in step S1 that HA information is necessary, the MN 10 performs DNS lookup on the domain name of the HA allocation server 3a (or the domain name of the MSP 3, service name+domain name of the MSP 3) in order to acquire an address of the HA allocation server 3a of the MPS 3 for the MN 10 itself (step S2). As a result, the MN 10 acquires the address of the HA allocation server 3a through the response message from the DNS server 1a (step 53). The MN 10 transmits the HA allocation request message 40, 40a including the domain name of the ASP 1 using the acquired address of the HA allocation server 3a as the destination (step S4). The HA allocation request server 3a that has received this message 40, 40a searches for the HA 3b for the MN 10, which is connected to the ASP 1 having the domain name included in the message 40, 40a (step S5), includes the result in the HA allocation response message 50, 50a, and transmits it to the MN 10 (step S6). The MN 10 that has received this message 50, 50a starts IKE in order to use the HA 3a included in the message 50, 50a, generating SA and acquiring HoA (step S7).

Figure 11:
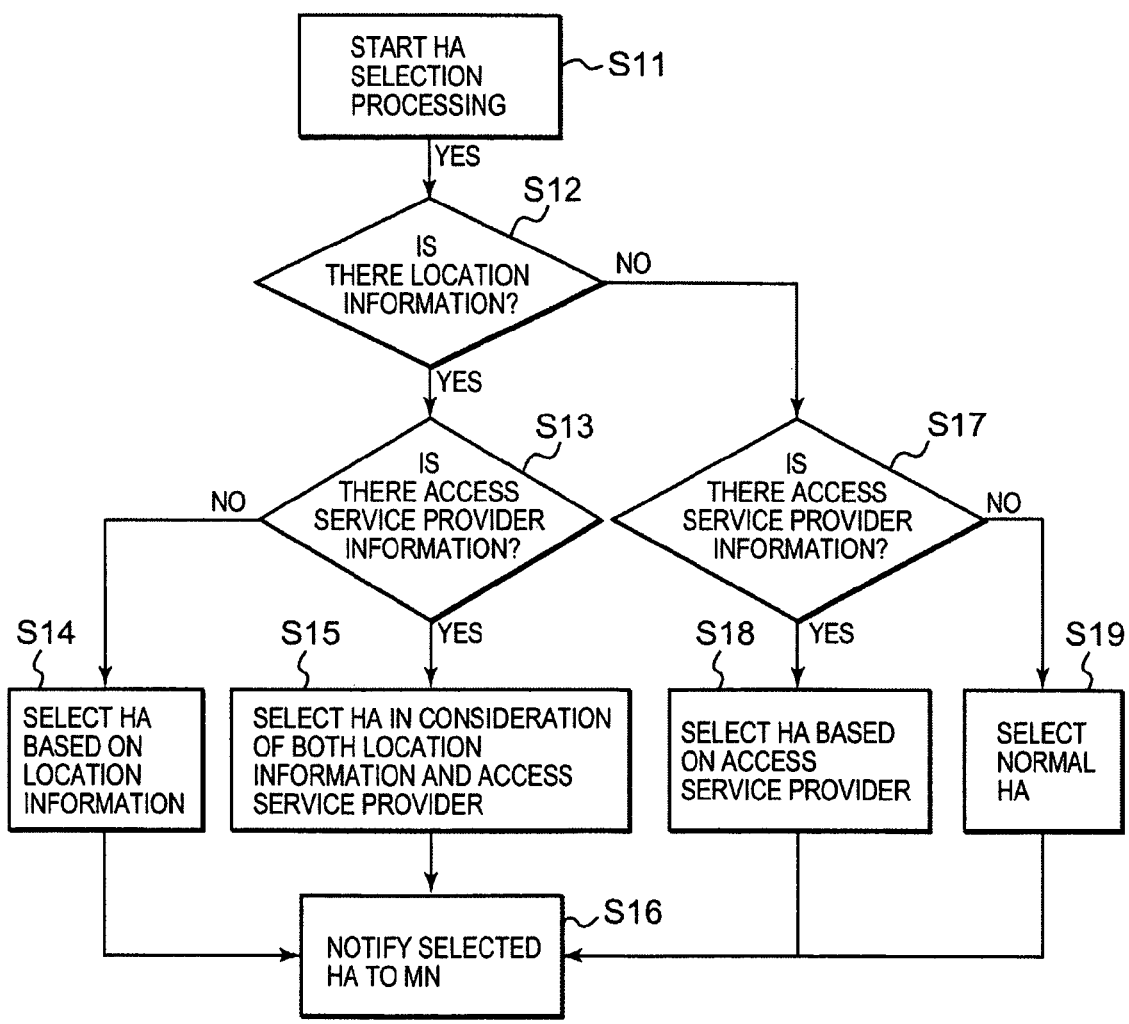
[FIG. 11] It is a flowchart for explaining HA selection processing by the HA allocation server of FIG. 1.

FIG. 11 shows the first embodiment of the present invention, particularly a flow of HA selection processing performed by the HA allocation server 3a in step S5 shown in FIG. 10. When receiving the HA allocation request message 40, 40a from the MN 10, the HA allocation server 3a starts HA selection processing (step S11). First, it determines whether there is location information of the MN 10 (step S12). If there is location information of the MN 10, it is determined whether there is information on the access service provider (ASP 1) (step S13), and if no information, an HA is selected based on the location information (step S14), and then processing proceeds to step S16. On the other hand, if it is determined in step S13 that there is information on the ASP 1, an HA is selected in consideration of both the location information and the ASP 1 (step S15), and then processing proceeds to step S16. Further, if it is determined in step S12 that there is no location information of the MN 10, it is determined whether there is information on the ASP 1 (step S17), and if there is the information, an HA is selected based on the ASP 1 (step S18), and then processing proceeds to step S16. On the other hand, if it is determined in step S17 that there is no information on the ASP 1, a normal HA is selected (step S19), and then processing proceeds to step S16. In step S16, the selected HA is notified to the MN 10 through the HA allocation response message 50, 50a.

The functions of the HA allocation server 3a according to the first embodiment of the present invention may be provided by the DNS server 1a. In this case, upon generation of the DNS lookup message to be transmitted to the DNS server 1a, the MN 10 refers to the currently-connected access service provider information holding section 105 (FIG. 2) to include information held therein and related to the ASP 1 to which the MN 10 is currently being connected (e.g., the domain name of the ASP 1) in the message. In this case, the MSP 3 needs to register with the DNS server 1a in such a manner to associate HAs prepared for respective ASPs with its domain name. At this time, the domain name of the ASP (or the domain name of the MSP, service name+domain name of the MSP) as information for specifying the address of each HA is registered in association with the address of the HA.

On the other hand, when receiving the DNS lookup message from the MN, the DNS server 1a refers to the registered information using the domain name of the MSP and the domain name of the ASP included in the message. Then, if an HA for the specified MSP and for the specified ASP is found, the address of the HA is transmitted to the MN by including it in the DNS response message.

The functions of the HA allocation server 3a according to the first embodiment of the present invention may be provided by any HA (HA 3b, HA 3c) existing in the MSP 3. In this case, the HA allocation request according to the first embodiment of the present invention may be made using DHAAD (Dynamic Home Agent Address Discovery) specified in Mobile IPv6. In such a case, upon generation of an HA address discovery request (Home Agent Address Discovery Request) message, the MN 10 refers to the currently-connected access service provider information holding section 105 to include, in the message, information (e.g., domain name of ASP 1) held therein and related to the ASP 1 to which the MN 10 is currently being connected. The HA has the same functions as the HA allocation server 3a and performs the same processing as the HA allocation request message processing section 38 (FIG. 7) upon receiving the "Home Agent Address Discovery Request" message. The subsequent processing is also the same, i.e., the address of the selected HA 3a is included in an HA address discovery response (Home Agent Address Discovery Response) message, and transmitted to the MN 10. The HA information list holding section 37 may be contained in a shared information server within the MSP 3. In this case, the HA that has received the "Request" message from the MN 10 transmits a query to the information server to acquire the address of the HA. Instead of the DHAAD, the HA allocation request message 40, 40a, and the HA allocation response message 50, 50a according to the first embodiment of the present invention may be used.

Further, if a network-based mobile control protocol (Proxy Mobile IPv6) is provided in the access network 1b to which the MN 10 is connected, the technique according to the first embodiment of the present invention may be so employed that when connected to the access network 1b, the MN 10 requests use of mobile IPv6 to cause itself to perform mobile control. Alternatively, when connected to the access network 1b, it may request dynamic allocation of a Local Mobility Anchor (LMA) used by proxy mobile IPv6 instead of an HA for mobile IPv6. In this case, allocation of an HA for proxy mobile IPv6 may be requested in the HA (LMA) allocation request message 40, 40a transmitted by the MN 10, or information for specifying whether allocation of an LMA for the network-based mobile control protocol should be requested may be included. Further, information for requesting allocation of a node that serves as both the LMA and the HA may be included.

The application is not limited to the case when connecting the IF 11 to the access network 1b, and the above method is also applicable to a case where either mobile IPv6 or proxy mobile IPv6 is in use and is switched to the other on condition that the IF 11 is already connected to the access network 1b. Note that, when requesting allocation of an LMA, the MN 10 may receive a notification indicative of whether the LMA has been allocated or not without the need to be notified of the address of the allocated LMA.

According to the first embodiment of the present invention, the HA allocation server 3a can dynamically allocate the HA and the LMA selected according to the access network 1b to which the MN 10 is being connected, the location information, and information for specifying the IF 11. This allows the MSP 3 to switch the HA and the LMA to be allocated to the MN managed by the MSP 3 according to the access network 1b and/or the location information. A route between the MN-HA and the LMA is optimized or a QoS state or the like is considered at the time of arranging the HA and LMA and at the time of selecting the HA and LMA to be allocated, enabling more effective HA and LMA allocation.

<Second Embodiment>

Figure 12:
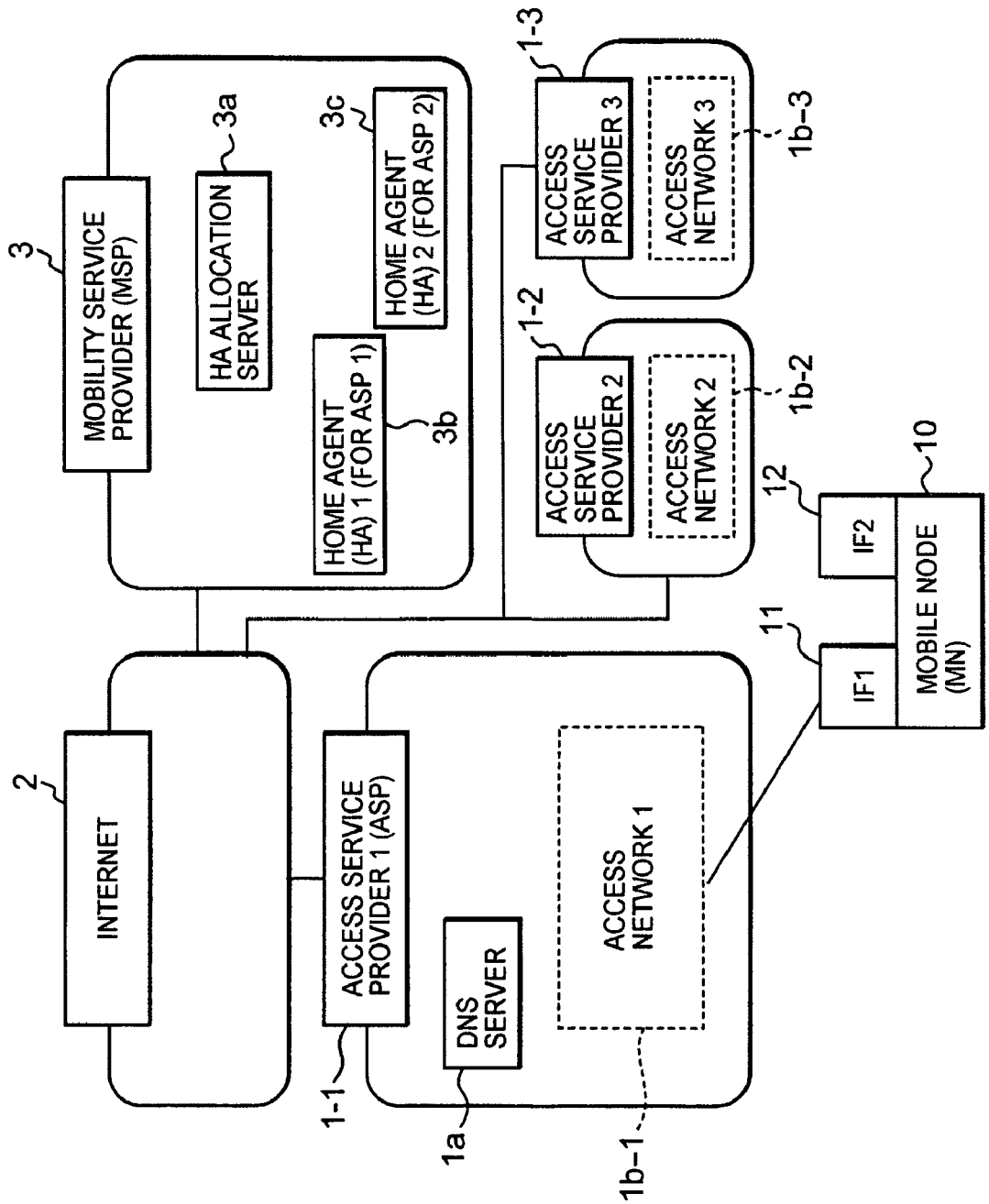
[FIG. 12] It is a block diagram showing a network configuration according to a second embodiment of the present invention.

In the second embodiment, as mentioned above, the MN 10 is a multi-interface node, the HA allocation server 3a is introduced, and the MN 10 notifies ASP information to the HA allocation server 3a. FIG. 12 is a diagram showing a network configuration according to the second embodiment of the present invention, where the MN 10 has plural interfaces 11 (IF 1), 12 (IF 2). An ASP 1-1 (access service provider 1) is a provider providing the MN 10 with an access service to the Internet 2, providing the DNS server 1a and an access network 1b-1 (access network 1) as a network to which the IF 1 of the MN 10 is connectable. ASPs I-2 (access service provider 2) and 1-3 (access service provider 3) provide access networks 1b-2 (access network 2) and 1b-3 (access network 3) to which the IF 2 of the MN is connectable. The MSP 3 is a provider providing the MN 10 with a mobility service, having the HA allocation server 3a and plural HAs 3b, 3c for mobility management of the MN 10. Here, the MN 10 is provided with two interfaces (IF 1, IF 2), In FIG. 12, the IF 1 is connected to the access network 1b-1, but the IF 2 is not connected to any of the access networks. The access service providers according to the second embodiment of the present invention are cellular operators providing cellular networks, Internet service providers providing hot spot or the like for connection to the Internet, or the like. The mobility service provider may serve not only as a provider providing the mobility service, but also as a provider providing the access service. Further, instead of assuming the IF 2 as the interface for connection to the access network 1b-2 or 1b-3 as shown in FIG. 12, a case may be assumed, where the IF 1 of the MN 10 hands over for connection to the access network 1b-2 or 1b-3. In this case, the MN 10 may have a configuration provided with one interface.

Figure 13:
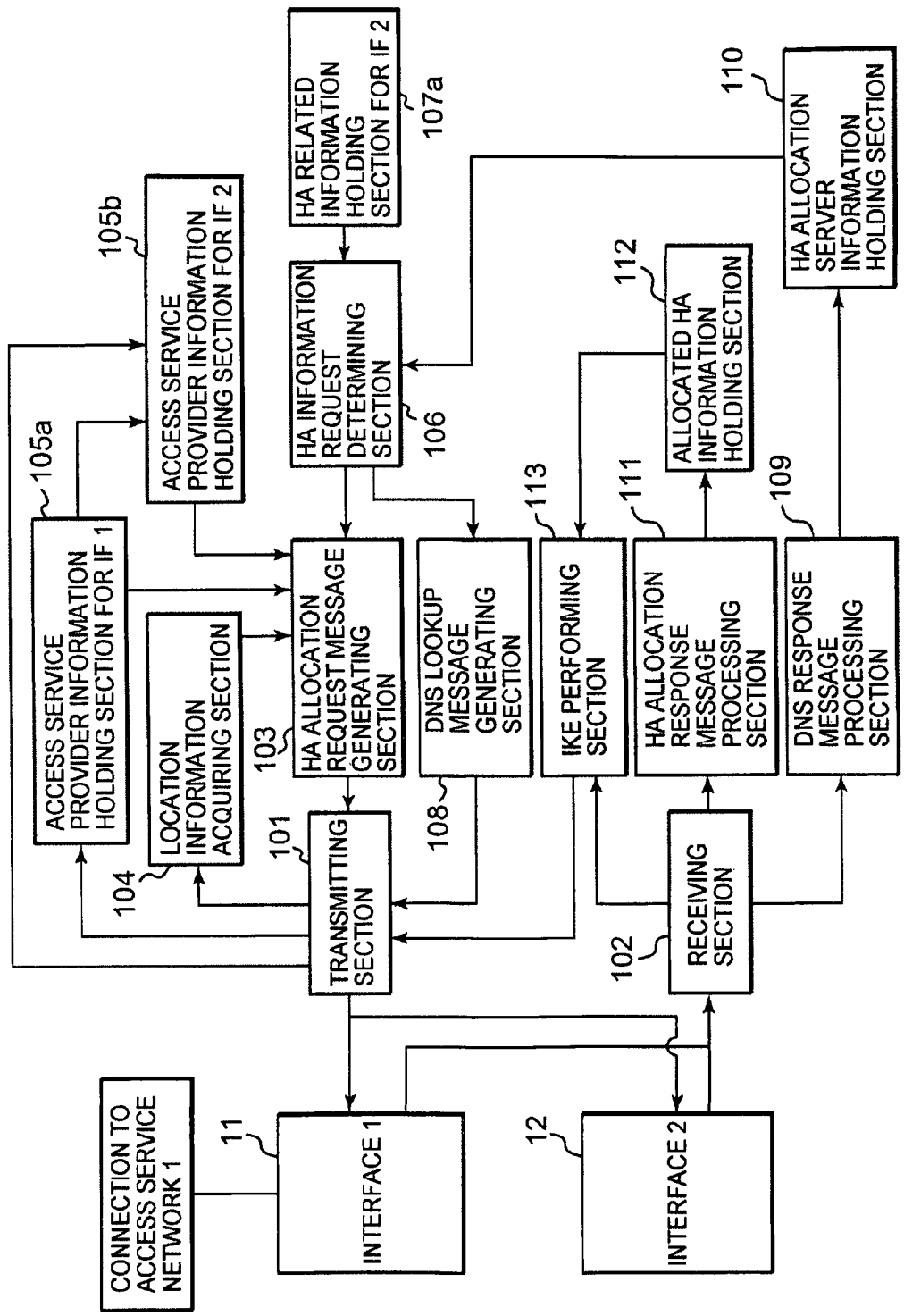
[FIG. 13] It is a block diagram showing, in detail, a configuration of a mobile node of FIG. 12.

FIG. 13 is a configuration example of the MN 10 according to the second embodiment of the present invention. The MN 10 has interfaces 11, 12, a transmitting section 101, a receiving section 102, an HA allocation request message generating section 103, a location information acquiring section 104, an access service provider information holding section 105a for IF 1, an access service provider information holding section 105b for IF 2, an HA information request determining section 106, an HA related information holding section 107a for IF 2, a DNS lookup message generating section 108, a DNS response message processing section 109, an HA allocation server information holding section 110, an HA allocation response message processing section 111, an allocated HA information holding section 112, and an IKE performing section 113 for IF 2.

In FIG. 13, upon receiving an instruction of an HA allocation request to the IF 2 from the HA information request determining section 106, the HA allocation request message generating section 103 generates an HA allocation request message 40b, 40c (to be described later) with a passed address of the HA allocation server 3*a* as the destination, passes it to the transmitting section 101, and instructs the transmitting section 101 to transmit it. At this time, the access service provider information holding section 105*b* for IF 2 is referred to include, in the message 40*b*, 40*c*, a list of information related to one or more access service providers (e.g., a list of domain names of ASPs 1-2 and 1-3) to which the IF 2 held therein is connectable. From a global perspective, it is preferable that the MN 10 should hold, as the domain names of the ASPs 1-2 and 1-3, domain names specified in such a manner that the top-level domains are identified by their country code top-level domains or generic top-level domains (e.g., "net") to enable the MSP 3 to distinguish them regionally or by category in order to make it possible for the MSP 3 to obtain connection points of the MN 10 more accurately.

In this case, the MN 10 needs to acquire domain names corresponding to the access networks 1*b*-2 and 1*b*-3 from the ASPs 1-2 and 1-3 and hold them, or to generate and hold appropriate domain names by itself based on information acquired from the ASPs 1-2 and 1-3. Further, the MN 10 may use preset information, or the MN 10 may hold ID information of access providers (access networks) to which it is connectable, and retrieve the information to acquire the domain name of a network connected. For example, in the case of a global ASP, if the MN 10 is connected to an access network provided in Japan, a domain name with a top-level domain of ".jp" is used, while if it is connected to an access network provided in USA, a domain name with a top-level domain of ".us" is used, so that the MSP 3 can not only identify the ASPs 1-2 and 1-3, but also identify the geographic locations of the access networks 1*b*-2 and 1*b*-3.

The HA allocation request message generating section 103 can also refer to the location information acquiring section 104 to acquire location information (GPS information or the like) of the MN 10 in order to include the location information in the message 40*b*, 40*c*. In this case, both the information related to the ASPs 1-2 and 1-3 to which the IF 2 is connectable and the location information may be included in the message 40*b*, 40*c*, or either of them may be included. Further, in addition to the above-mentioned information, the HA allocation request message generating section 103 can also specify either "Local" or "Network" as a location where a desired HA to be allocated exists. In this case, in addition to the specification of "Local" or "Network," both or either of the information related to the ASPs 1-2 and 1-3 to which the IF 2 is connectable and the location information may be included in the message 40*b*, 40*c*.

The location information acquiring section 104 provides current location information of the MN 10 to the HA allocation request message generating section 103. As the location information, for example, location information acquired using a GPS device, information acquired from the access network 1*b*-1 to which the IF 1 is connected (SSID of an access point connected, advertised prefix, etc.), a MAC address of the IF 1 or ID (MN-ID) of the MN 10 related to the IF 1 as information for specifying the IF 1, or information related to the access network 1*b*-2 or 1*b*-3 to which the IF 2 was connected just before or a given time ago can be used. As information for specifying an interface to be connected to the access network 1*b*-2 or 1*b*-3, a MAC address related to the IF 2 or ID (MN-ID) of the MN 10 related to the IF 2 can also be used. The HA allocation request message generating section 103 may include, in the message 40*b*, 40*c*, information indicating that information included in the message 40*b*, 40*c* to be generated is information on an interface different from the interface used in actual message transmission. For example, a method of setting a flag, the type of different message, or the type of option may be used.

Figure 14:
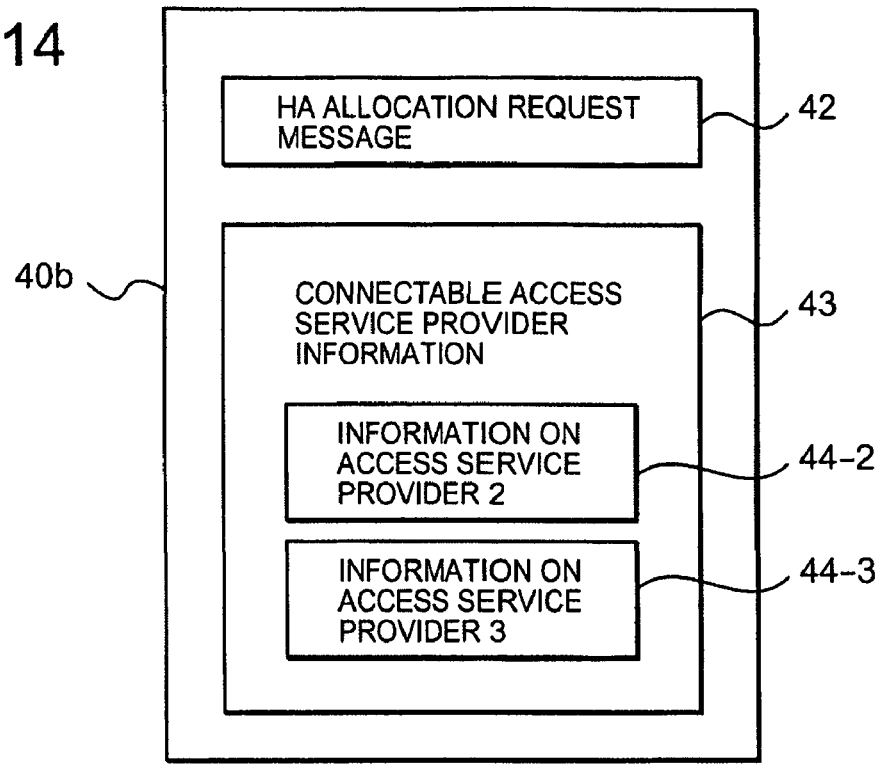
[FIG. 14] It is an explanatory diagram showing a format example of an HA allocation request message in the second embodiment.
Figure 15:
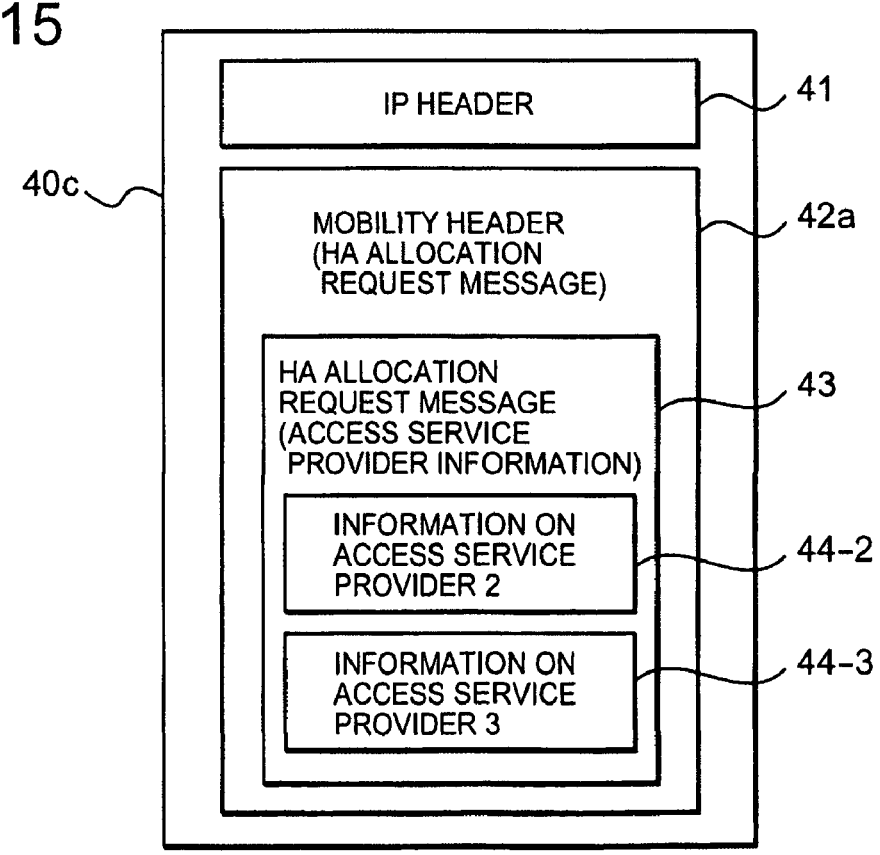
[FIG. 15] It is an explanatory diagram showing another format example of the HA allocation request message in the second embodiment.

FIG. 14 is a format example of the HA allocation request message 40*b*. The request message 40*b* includes a value (42 in FIG. 14) indicating that this is an HA allocation request message, and pieces of information 44-2 and 44-3 respectively on the ASP 1-2 (access service provider 2) and the ASP 1-3 (access service provider 3) as access service provider information 43 to be notified. FIG. 15 is a format example of the HA allocation request message 40*c* in the case of use of a mobility header. A value (42*a* in FIG. 15) indicative of the HA allocation request message is specified in a Type field of the mobility header, and inside the message 43, the pieces of information 44-2 and 44-3 respectively on the ASP 1-2 (access service provider 2) and the ASP 1-3 (access service provider 3) are stored. The pieces of information 44-2 and 44-3 on the ASPs 1-2 and 1-3 may be included as mobility options. Like those shown in FIG. 3B and FIG. 4B, location information 45 may also be added to the message 40*b*, 40*c* respectively shown in FIG. 14 and FIG. 15.

Returning to FIG. 13, the access service provider information holding section 105*a* for IF 1 holds information related to the ASP 1-1 to which the interface 11 is being connected or is connectable. As the acquisition method, preset information may be used, or the information may be acquired from the ASP 1-1 through the transmitting section 101. As the information related to the ASP 1-1, the domain name may be used, for example. The access service provider information holding section 105*b* for IF 2 holds information related to the ASPs 1-2 and 1-3 (contracted or free) to which the interface 12 is being connected or is connectable. As the acquisition method, preset information may be used, or the information may be acquired from the ASPs 1-2 and 1-3 through the transmitting section 101. As the information related to the ASPs 1-2 and 1-3, domain names can be used, for example. Further, access service provider information for IF 1 held by the access service provider information holding section 105*a* for IF 1 may also be referred to specify the top-level domain of the domain names of the access service providers for IF 2. For example, if the top-level domain of the domain name of the ASP 1-1 to which the IF 1 is currently being connected is ".jp," ".jp" can be used as the top-level domain of the domain names of the ASPs 1-2 and 1-3, to which the IF 2 is connectable, to specify the country code top-level domain of the domain names for the unconnected IF 2. Note that the access service provider information holding section 105*a* for IF 1 and the access service provider information holding section 105*b* for IF 2 may be implemented as the same holding section.

The HA information request determining section 106 serves to start the operation of acquiring HA information at any timing, or when it is detected that the MN 10 needs allocation of an HA while the IF 2 is in no connection. In the operation of acquiring HA information, the HA information request determining section 106 first refers to the HA related information holding section 107*a* for IF 2, passes HA related information (e.g., the domain name of the MSP 3) held therein to the DNS lookup message generating section 108, and instructs it to acquire an address. Further, the HA information request determining section 106 acquires the address of the HA allocation server 3*a* from the HA allocation server information held by the HA allocation server information holding section 110, passes it to the HA allocation request message generating section 103, and instructs it to generate the HA allocation request message 40*b*, 40*c* for IF 2. The information passed to the DNS lookup message generating section 108 may be the FQDN (Fully Qualified Domain Name) of the HA allocation server 3*a*. Further, according to the rules of RFC2782, a value with a service name added to the domain name of the MSP may be used.

Since the DNS lookup message generating section 108, the DNS response message processing section 109, the HA allocation server information holding section 110, the HA allocation response message processing section 111, the allocated HA information holding section 112, and the IKE performing section 113 are the same as those in the first embodiment of the present invention, their description will be omitted.

Figure 16:
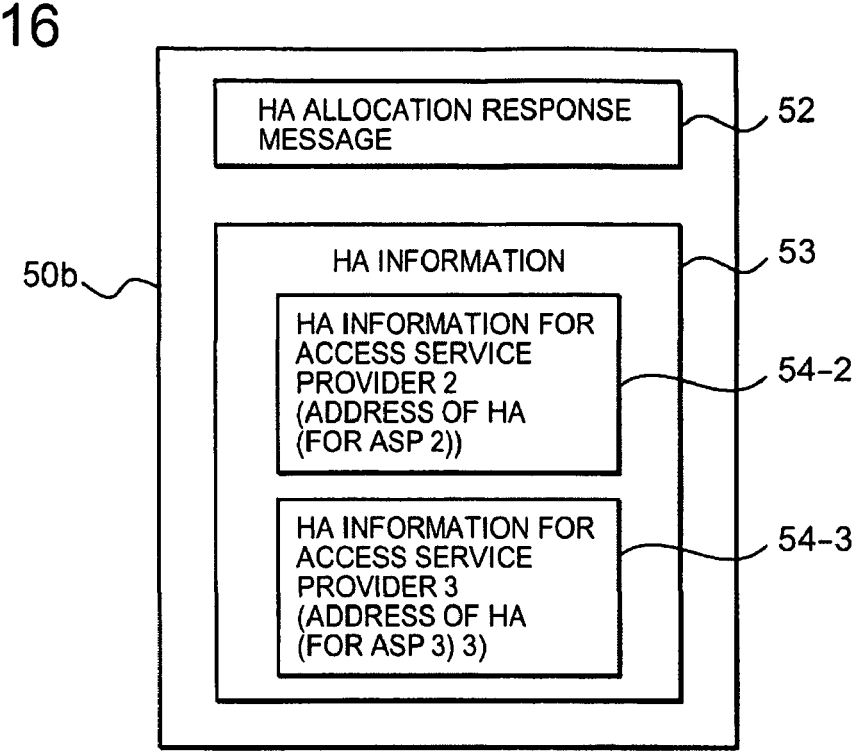
[FIG. 16] It is an explanatory diagram showing a format example of an HA allocation response message in the second embodiment.
Figure 17:
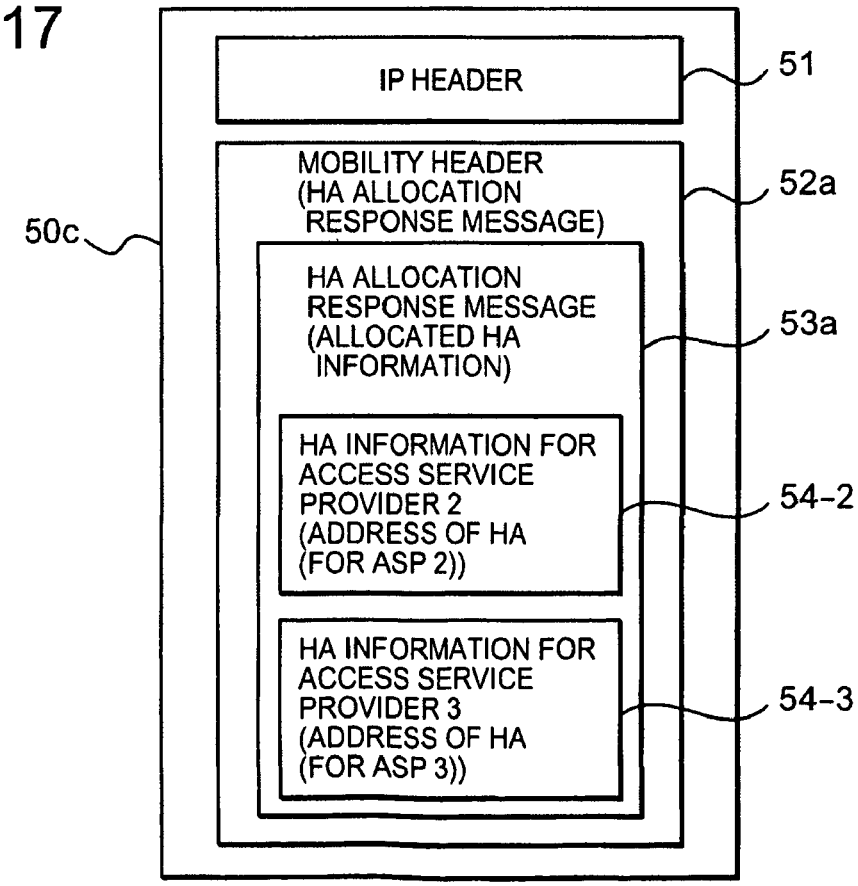
[FIG. 17] It is an explanatory diagram showing another format example of the HA allocation response message in the second embodiment.

FIG. 16 is a format example of an HA allocation response message 50*b*. The response message 50*b* includes a value (52 in FIG. 16) indicating that this is the HA allocation response message 50*b*, and HA information 54-2 for the ASP 1-2 (access service provider 2) and HA information 54-3 for the ASP 1-3 (access service provider 3) as information 53 on HAs to be allocated. FIG. 17 is a format example of an HA allocation response message 50*c* in the case of use of a mobility header. In the response message 50*c*, a value (52*a* in FIG. 17) indicative of the HA allocation response message 50*c* is specified in a Type field of the mobility header, and inside the message 50*c*, HA information 54-2 for the ASP 1-2 (access service provider 2) and HA information 54-3 for the ASP 1-3 (access service provider 3) are stored as allocated HA information 53*a*. The HA information 54-2 for the ASP 1-2 and the HA information 54-3 for the ASP 1-3 may be included as mobility options. If the MN 10 knows the address of the HA allocation server 3*a* beforehand, address search by the DNS may not be performed.

Figure 18:
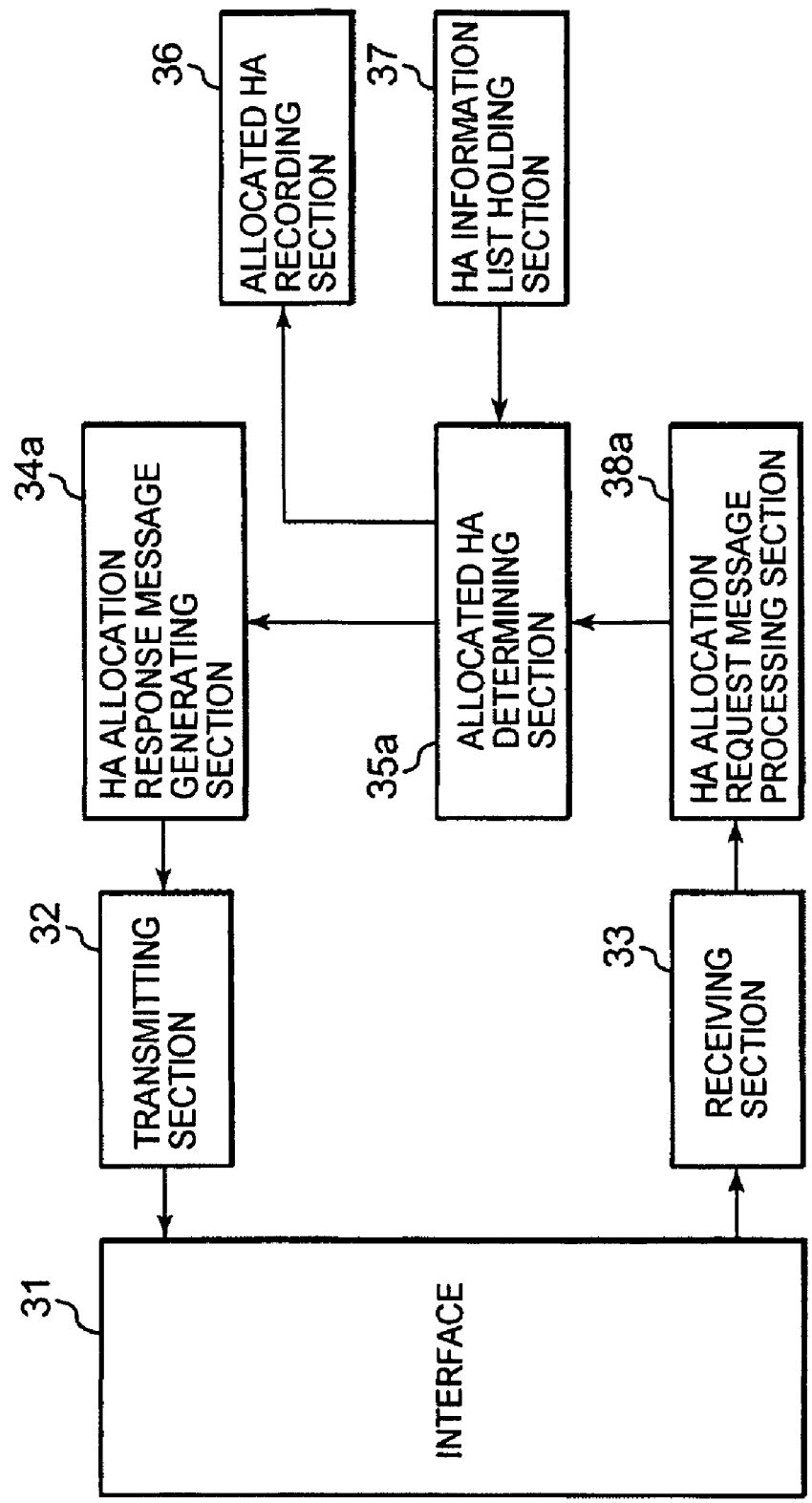
[FIG. 18] It is a block diagram showing, in detail, a configuration of an HA allocation server of FIG. 12.

FIG. 18 is a configuration example of the HA allocation server 3*a* according to the second embodiment of the present invention. An HA allocation response message generating section 34*a* receives an instruction from an allocated HA determining section 35*a*, generates the HA allocation response message 50*b*, 50*c* including passed one or more pieces of HA information, passes it to the transmitting section 32, and instructs the transmitting section 32 to transmit it. The allocated HA determining section 35*a* receives an instruction from an HA allocation request message processing section 38*a*, refers to the HA information list holding section 37, and determines an HA for the MN 10 belonging to the SP 1-2 and 1-3 corresponding to the passed one or more domain names. Further, the allocated HA determining section 35*a* passes the HA information to the allocated HA recording section 36 to request the allocated HA recording section 36 to record it as the HA allocated to the MN 10, while the allocated HA determining section 35*a* passes it to and instructs an HA allocation response message generating section 34*a* to generate the HA allocation response message 50*b*, 50*c*.

The HA allocation request message processing section 38*a* processes the HA allocation request message 40*b*, 40*c* received from the MN 10 to acquire the domain name(s) of one or more ASPs included in the message 40*b*, 40*c*, and passes the domain name(s) to and instructs the allocated HA determining section 35*a* to determine an HA to be allocated. Further, if the location information of the MN 10 is included in the received HA allocation request message 40*b*, 40*c*, an HA located near the MN 10 can be selected based on the location information, or both the location information and the domain names of the ASP 1-2 and 1-3 can be used to select an HA, which is for an ASP to which the IF 2 is connectable, and is located near the MN.

Further, if "Local" is specified in the received HA allocation request message 40*b*, 40*c*, it can be determined that an HA existing in a "Local" area as seen from the location information of the MN 10 is selected, while if "Network" is specified, it can be determined that an HA existing in a "Network" area as seen from the location information of the MN 10 is selected. Since the interface 31, the transmitting section 32, the receiving section 33, the HA information list holding section 37, and the allocated HA recording section 36 are the same as those in the first embodiment of the present invention, their description will be omitted.

Figure 19:
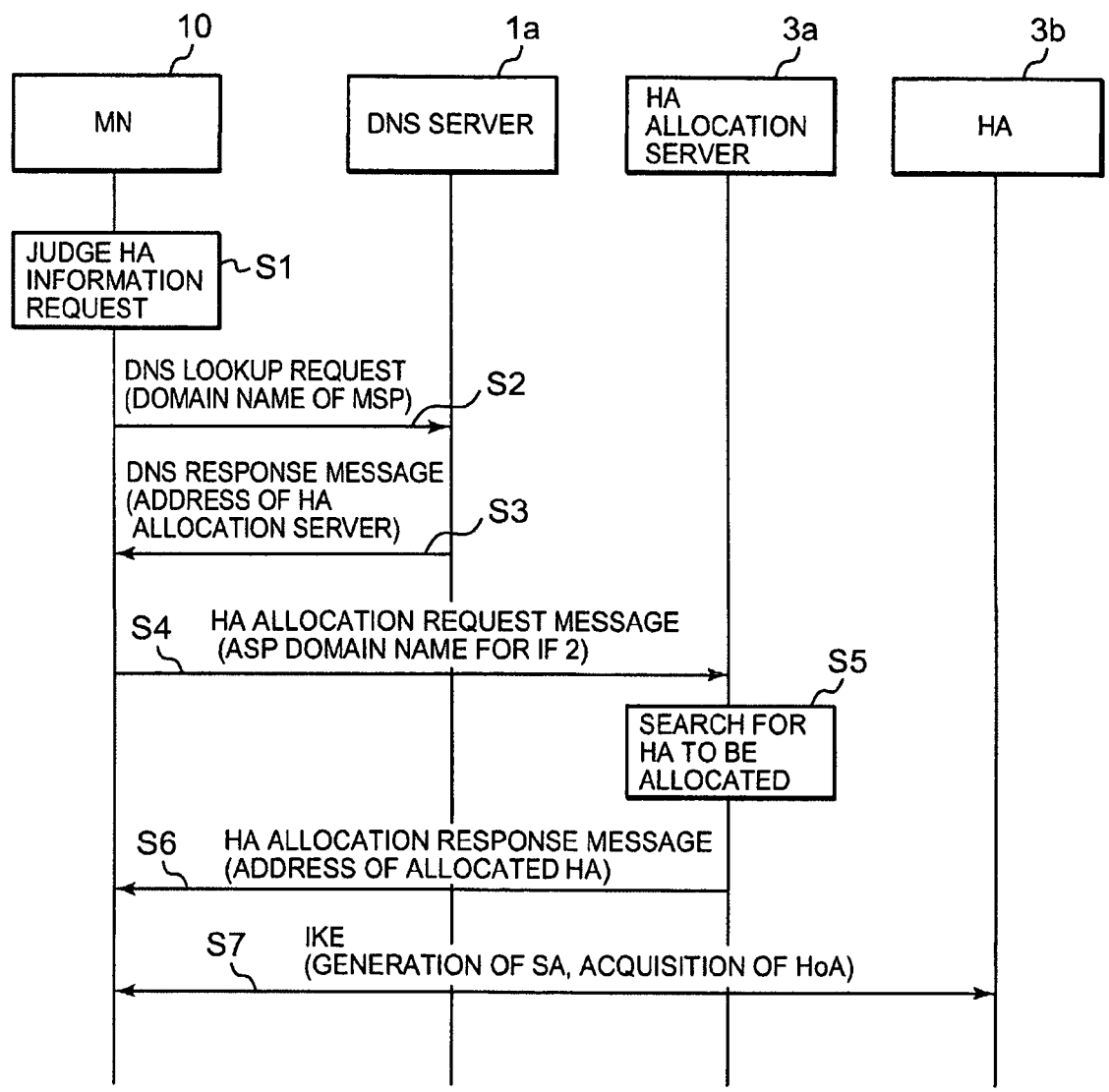
[FIG. 19] It is an explanatory diagram showing a network communication sequence in the second embodiment.
Figure 20:
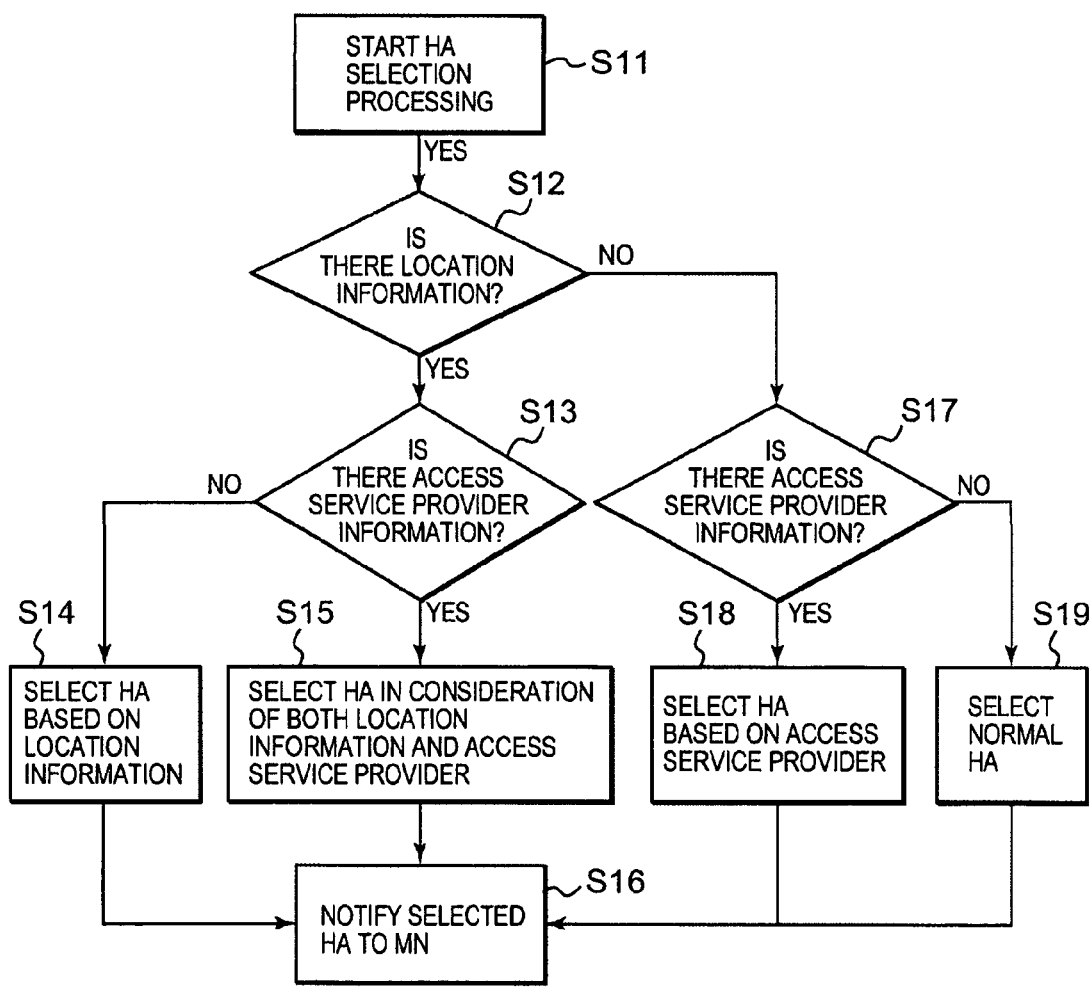
[FIG. 20] It is a flowchart for explaining HA selection processing by the HA allocation server of FIG. 12.

As shown in FIG. 19, a sequence of messages according to the second embodiment of the present invention is almost the same as that in FIG. 10, except that the domain names included in the HA allocation request message 40*b*, 40*c* transmitted in step S4 by the MN 10 are the domain names of the ASP 1-2 and 1-3 to which the IF 2 is connectable. Further, as shown in FIG. 20, a flow of HA selection processing by the HA allocation server 3*a* according to the second embodiment of the present invention is almost the same as that in FIG. 11, except that information in steps S13, S15, S16, S17, and S18 is ID information of the ASP 1-2 and 1-3 to which the IF 2 is connectable and the location information.

The functions of the HA allocation server 3*a* according to the second embodiment of the present invention may be provided by the DNS server 1*a*. In this case, upon generation of a DNS lookup message to be transmitted to the DNS server 1*a*, the MN 10 refers to the access service provider information holding section 105*b* for IF 2 to include, in the message, information held therein and related to ASPs to which the IF 2 is connectable (e.g., the domain names of the ASPs 1-2 and 1-3). In this case, the MSP 3 needs to register with the DNS server 1*a* in such a manner to associate the address of an HA, prepared for each of the ASPs 1-2 and 1-3, with its domain name. At this time, the domain names of the ASP 1-2 and 1-3 (or the domain name of the MSP 3, service name+domain name of the MSP 3) as information for specifying the address of each HA are registered in association with the address of the HA.

On the other hand, when receiving the DNS lookup message from the MN 10, the DNS server 1*a* refers to the registered information using the domain name of the MSP 3 and the domain name of the ASP 1 included in the message. Then, if an HA for the specified MSP 3 and for the specified ASP1 is found, the address of the HA is transmitted to the MN 10 by including it in the DNS response message.

The functions of the HA allocation server 3*a* according to the second embodiment of the present invention may be provided by any HA (HA 3*b*, HA 3*c*) existing in the MSP 3. In this case, the HA allocation request according to the second embodiment of the present invention may be made using "Dynamic Home Agent Address Discovery" specified in Mobile IPv6. In such a case, upon generation of a Home Agent Address Discovery Request message, the MN 10 refers to the access service provider information holding section 105*b* for IF 2 to include, in the message, information (e.g., the domain names of the ASPs 1-2 and 1-3) held therein and related to the ASPs to which the IF 2 is connectable. The HA has the same functions as the HA allocation server 3*a*, and performs the same processing as the HA allocation request message processing section 38*a* upon receiving the "Home Agent Address Discovery Request" message from the MN 10. The subsequent processing is also the same, i.e., the address of the selected HA is included in the "Home Agent Address Discovery Response" message, and transmitted to the MN 10.

The HA information list holding section 37 may be contained in a shared information server within the MSP 3. In this case, the HA that has received the "Request" message from the MN 10 transmits a query to the information server to acquire the address of the HA. Instead of the DHAAD, the HA allocation request message 40, 40*a*, and the HA allocation response message 50, 50*a* according to the first embodiment of the present invention may be used.

Further, if a network-based mobile control protocol (Proxy Mobile IPv6) is provided in the access networks 1*b*-2 and 1*b*-3 to which the IF 2 of the MN 10 is connectable, the technique according to the second embodiment of the present invention may be so employed that the MN 10 requests use of mobile IPv6 to cause itself to perform mobile control instead of using the network-based mobile control protocol before the IF 2 is connected to the access network. Further, in the case of use of proxy mobile IPv6 when the IF 2 is connected to the access network 1*b*-2 or 1*b*-3, it may request dynamic allocation of a Local Mobility Anchor (LMA) used by proxy mobile IPv6, instead of the HA for mobile IPv6, before the IF 2 is connected.

In this case, allocation of an HA for proxy mobile IPv6 may be requested in the HA (LMA) allocation request message 40, 40*a* transmitted by the MN 10, or information for specifying an LMA allocation request for the network-based mobile control protocol may be included. Further, information for requesting allocation of a node that serves as both the LMA and the HA may be included. The application is not limited to the case when newly connecting the IF 2 to the access network 1*b*-2 or 1*b*-3, and the above method is also applicable to a case where the IF 1 already connected to the access network 1*b*-1 hands over to change the connected destination to the access network 1*b*-2 or 1*b*-3.

The above method is further applicable to a case where either mobile IPv6 or proxy mobile IPv6 is in use and is switched to the other on condition that the IF 2 is connected to the access network 1*b*. Note that, when requesting allocation of an LMA, the MN 10 may receive a notification indicative of whether the LMA has been allocated or not without the need to be notified of the address of the allocated LMA.

According to the second embodiment of the present invention, the HA and LMA selected according to the ASPs (ASP 1-2 and 1-3) to which the IF 2 of the MN 10 is connectable, the location information, and the information for specifying the IF 2 can be dynamically allocated. This allows the MSP 3 to change the HA and the LMA to be allocated to the MN 10 according to the ASPs 1-2, 1-3 and/or the location information. Further, even if there is an interface that is in no connection to the access network 1*b*-2, 1*b*-3, the HA and LMA for the ASP 1-2, 1-3 to be connected can be allocated to the MN 10 as the HA and LMA used when the interface is connected again to the access network 1*b*-2, 1*b*-3. A route between HA-IF 2 of the MN 10 and the LMA is optimized or a QoS state or the like is considered at the time of arranging the HA and LMA and at the time of selecting the HA and LMA to be allocated, enabling more effective HA and LMA allocation.

<Third Embodiment>

(In the case of "Integrated," multi-interface, HA allocation server introduced, access service provider information notified.)

Figure 21:
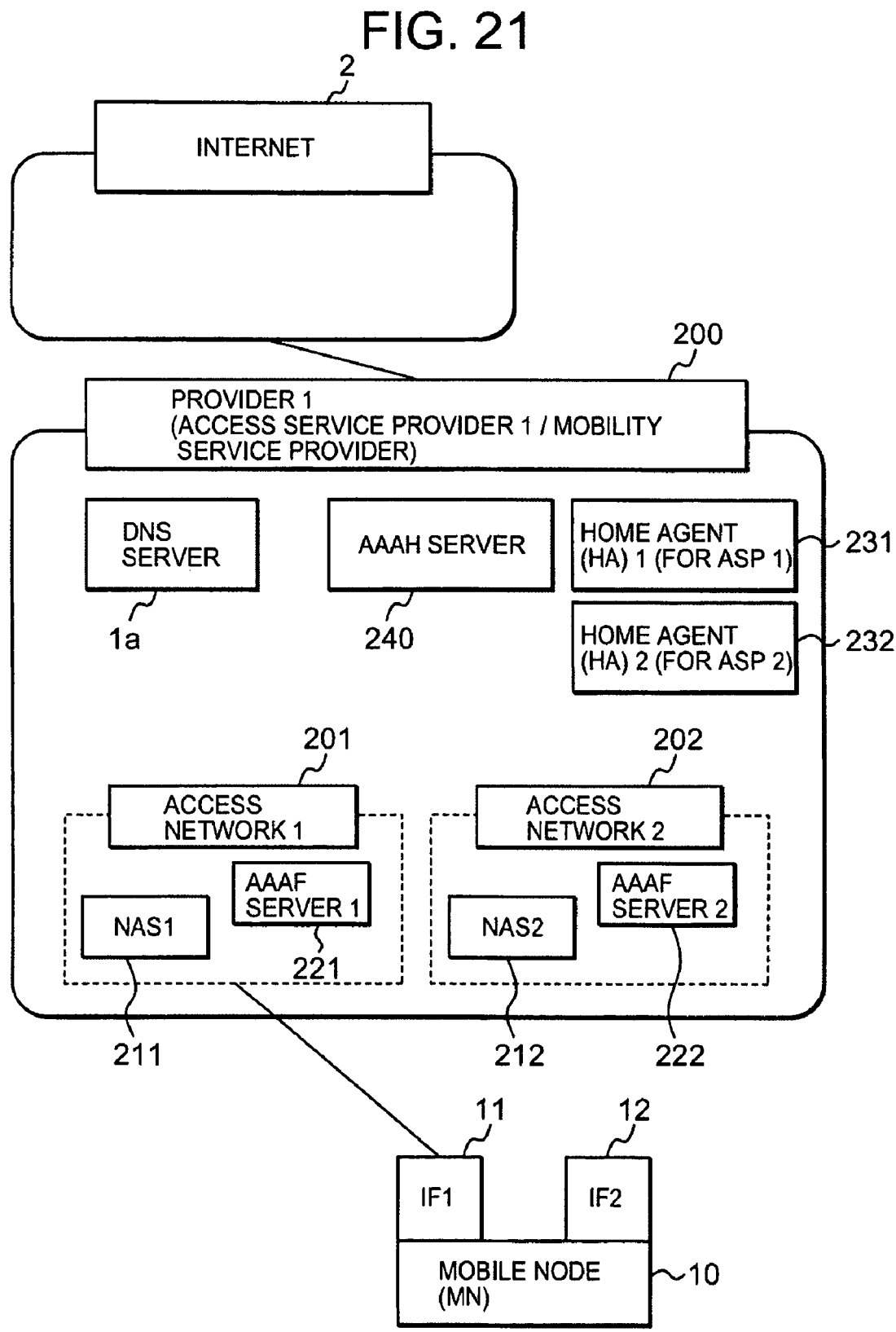
[FIG. 21] It is a block diagram showing a network configuration according to a third embodiment of the present invention.

FIG. 21 is a diagram showing a network configuration according to the third embodiment of the present invention. A provider 200 serves as both an access service provider (ASP) and a mobility service provider (MSP). The provider 200 as the ASP provides the MN 10 with an access service to the Internet 2, providing the DNS server 1*a*, and access networks 201 (access network 1) and 202 (access network 2) to which the MN 10 is connectable. The provider 200 as the MSP provides the MN 10 with a mobility service, having plural HAs 231 and 232 (HA 1 and HA 2) for mobility management of the MN 10. The MN 10 is provided with two interfaces (IF 1, IF 2), where the IF 1 is connected to the access network 201, and the IF 2 is in no connection. Although the access networks 201 and 202 in FIG. 21 are access networks provided by the provider 200, even if these access networks 201 and 202 are provided by different providers, the same configuration as that of the same provider can be assumed as long as there is a roaming relation between these providers. The provider according to the third embodiment of the present invention is a cellular operator providing cellular networks, an Internet service provider providing hot spot or the like for connection to the Internet, or the like. Further, it there is a roaming relation between the cellular operator providing the access service and the Internet service provider providing the mobility service/access service, they can be assumed as the same provider. Further, instead of assuming the IF 2 as the interface for connection to the access network 202 as shown in FIG. 21, a case may be assumed, where the IF 1 of the MN 10 hands over for connection to the access network 1*b*-2 or 1*b*-3. In this case, the MN 10 may have a configuration with one interface.

Figure 22:
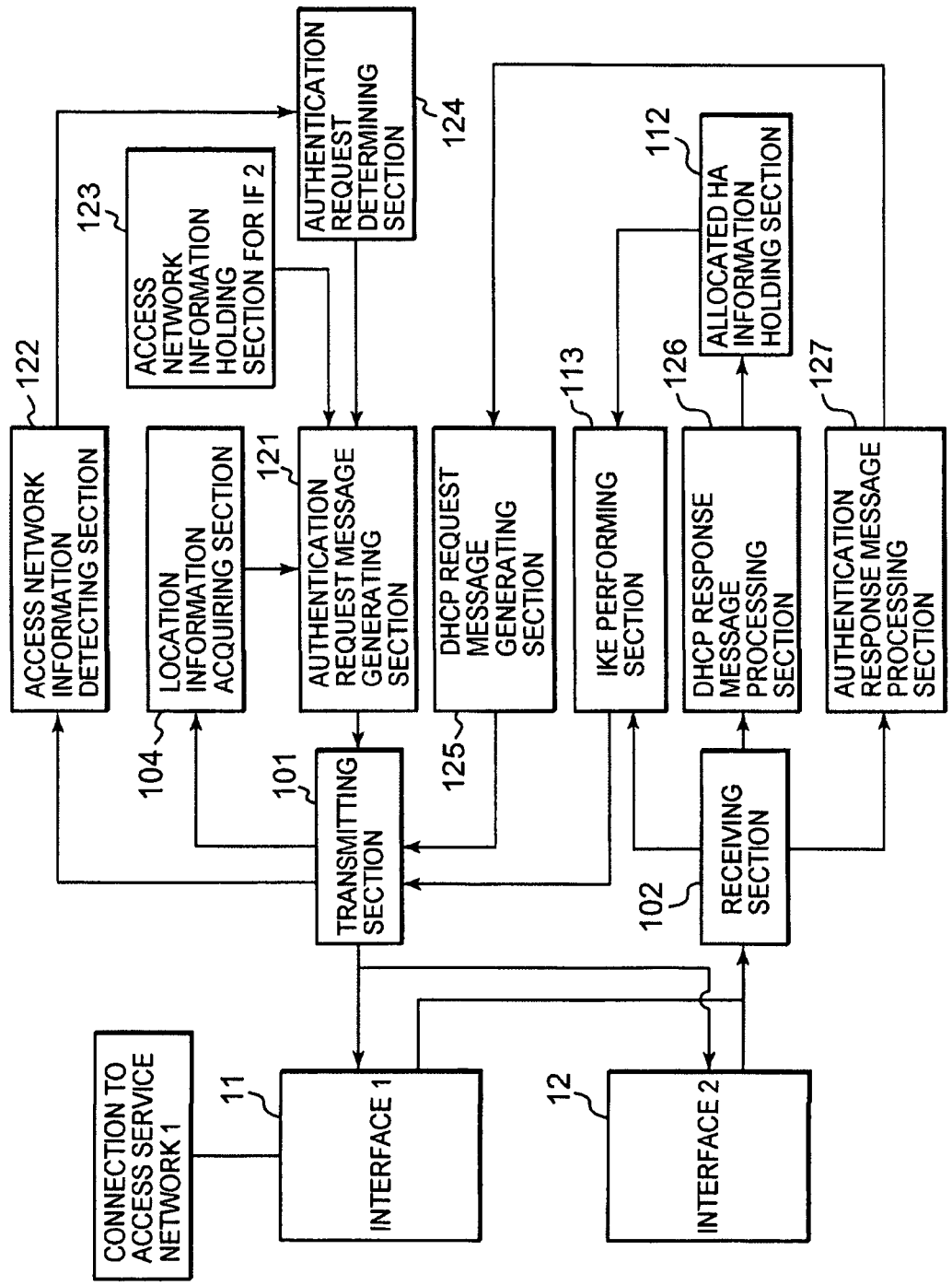
[FIG. 22] It is a block diagram showing, in detail, a configuration of a mobile node of FIG. 21.

FIG. 22 is a configuration example of the MN 10 according to the third embodiment of the present invention. The MN 10 has an interface 11 (IF 1), an interface 12 (IF 2), a transmitting section 101, a receiving section 102, an authentication request message generating section 121, an access network information detecting section 122, an access network information holding section 123 for IF 2, a location information acquiring section 104, an authentication request determining section 124, a DHCP request message generating section 125, a DHCP response message processing section 126, an authentication response message processing section 127, an allocated HA information holding section 112, and an IKE performing section 113.

The authentication request message generating section 121 receives an instruction from the authentication request determining section 124, generates an authentication request message 60 (to be described later) to request the access service to the access network 201 to be connected, passes it to the transmitting section 101, and instructs the transmitting section 101 to transmit it. At this time, information passed from the authentication request determining section 124 and related to the access network 202 to which the IF 2 is connectable (e.g., the type of network access mechanism to which the IF 2 is connectable, an identifier of the access network 202: SSID, Mac address of access point, etc.) is included in the message 60. As means of access authentication, IEEE 802.11i or 802.1x, PANA (Protocol for carrying Authentication for Network Access) may be used, for example. The destination of the authentication request transmitted by the MN 10 is an NAS (network access server) (NAS 1) 211 existing in the access network 201. The NAS 211 converts the access authentication request from the MN 10 into an authentication protocol (e.g., RADIUS or DIAMETER) used for communication with an AAAH server 240, and transmits it. The NAS 211 may transfer it to an AAAF server 221 (AAAF server 1) instead of the AAAH server 240 so that the AAAF server 221 will further transfer it to the AAAH server 240. In the third embodiment, the authentication request message is used as the message for requesting HA allocation, but the same HA allocation request message as that in the first embodiment and second embodiment may be used instead of the authentication request message.

Further, the authentication request message generating section 121 can refer to the location information acquiring section 104 to acquire the location information (GPS information or the like) of the MN 10 and include it in the message 60. In this case, both the information related to the access network 202 to which the IF 2 is connectable and the location information may be included in the message 60, or either of them may be included. Further, in addition to the above information, the authentication request message generating section 121 can specify either "Local" or "Network" as a location where a desired HA to be allocated exists. In such a case, in addition to the specification of "Local" or "Network," both or either of the information related to the access network 202 to which the IF 2 is connectable and the location information may be included in the message 60.

The location information acquiring section 104 provides current location information of the MN 10 to the authentication request message generating section 121. As the location information, for example, location information acquired using a GPS device, information acquired from the access network 201 to which the IF 1 is being connected (SSID of an access point connected, advertised prefix, etc.), a MAC address of the IF 1 or ID (MN-ID) of the MN 10 related to the IF 1 as information for specifying the IF 1, or information related to the access network 202 to which the IF 2 was connected just before or a given time ago can be used. As information for specifying an interface to be connected to the access network 202, a MAC address related to the IF 2 or ID (MN-ID) of the MN 10 related to the IF 2 can be used. The authentication request message generating section 121 may include, in the message 60, information indicating that information included in the message 60 to be generated is information on an interface different from the interface for actual message transmission. For example, a method of setting a flag, the type of different message, or the type of option may be used.

Figure 23:
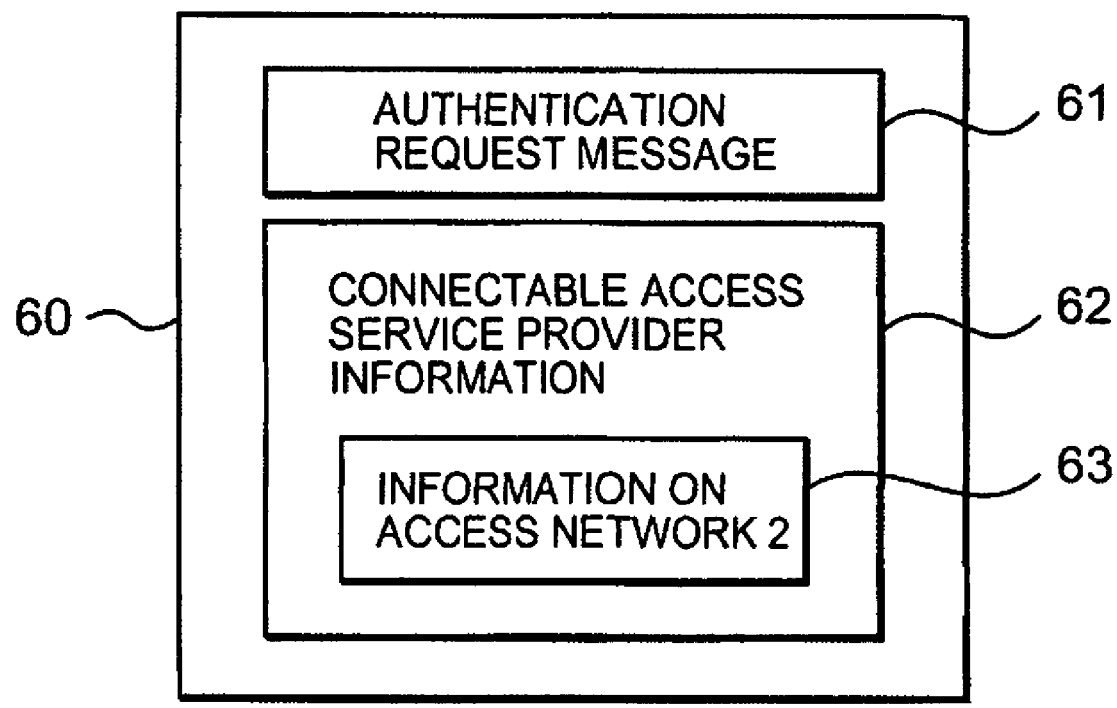
[FIG. 23] It is an explanatory diagram showing a format example of an authentication request message in the third embodiment.

The authentication request message generating section 121 may include, in the message 60, information indicating that information included in the message 60 to be generated is information on an interface different from the interface for actual message transmission. For example, a method of setting a flag, the type of different message, or the type of option may be used. FIG. 23 is a format example of the authentication request message 60. The authentication request message 60 includes a value (61 in FIG. 23) indicating that this is the authentication request message 60, and information on the access network 202 (access network 2) as access service provider information 62 to be notified. Further, as shown in FIG. 3B and FIG. 4B, the location information 45 may be added.

The access network information detecting section 122 detects information related to the access network 201 from beacon information from the access network 201 received by the interface 11. As the information related to the access network 201, an identifier of the access network 201, SSID, an MAC address of an access point, etc., can be used, for example. The authentication request determining section 124 determines whether the authentication request for connection to the access network 201 detected by the access network information detecting section 122 should be started. If it is determined that authentication should be started, the authentication request determining section 124 passes, to the authentication request message generating section 121, information passed from the access network information detecting section 122 as the information related to the access network 201 to be connected.

The DHCP request message generating section 125 receives an instruction from the authentication response message processing section 127, generates a DHCP request message for acquiring an address used on the connected access network 201, passes it to the transmitting section 101, and instructs the transmitting section 101 to transmit it. The DHCP response message processing section 126 processes a DHCP response message as a response to the transmitted DHCP Request message to acquire information on an allocated HA included in the message, and passes it to and instructs the allocated HA information holding section 112 to hold.

The allocated HA information holding section 112 holds the allocated HA information passed from the DHCP response message processing section 126. The authentication response message processing section 127 processes the authentication response message received from the access network 201 to be connected, and if the authentication succeeds, it instructs the DHCP request message generating section 125 to perform address acquiring processing. The IKE performing section 113 performs IKE on the address of the allocated HA held in the allocated HA information holding section 112 to generate SA and acquire HoA.

Figure 24:
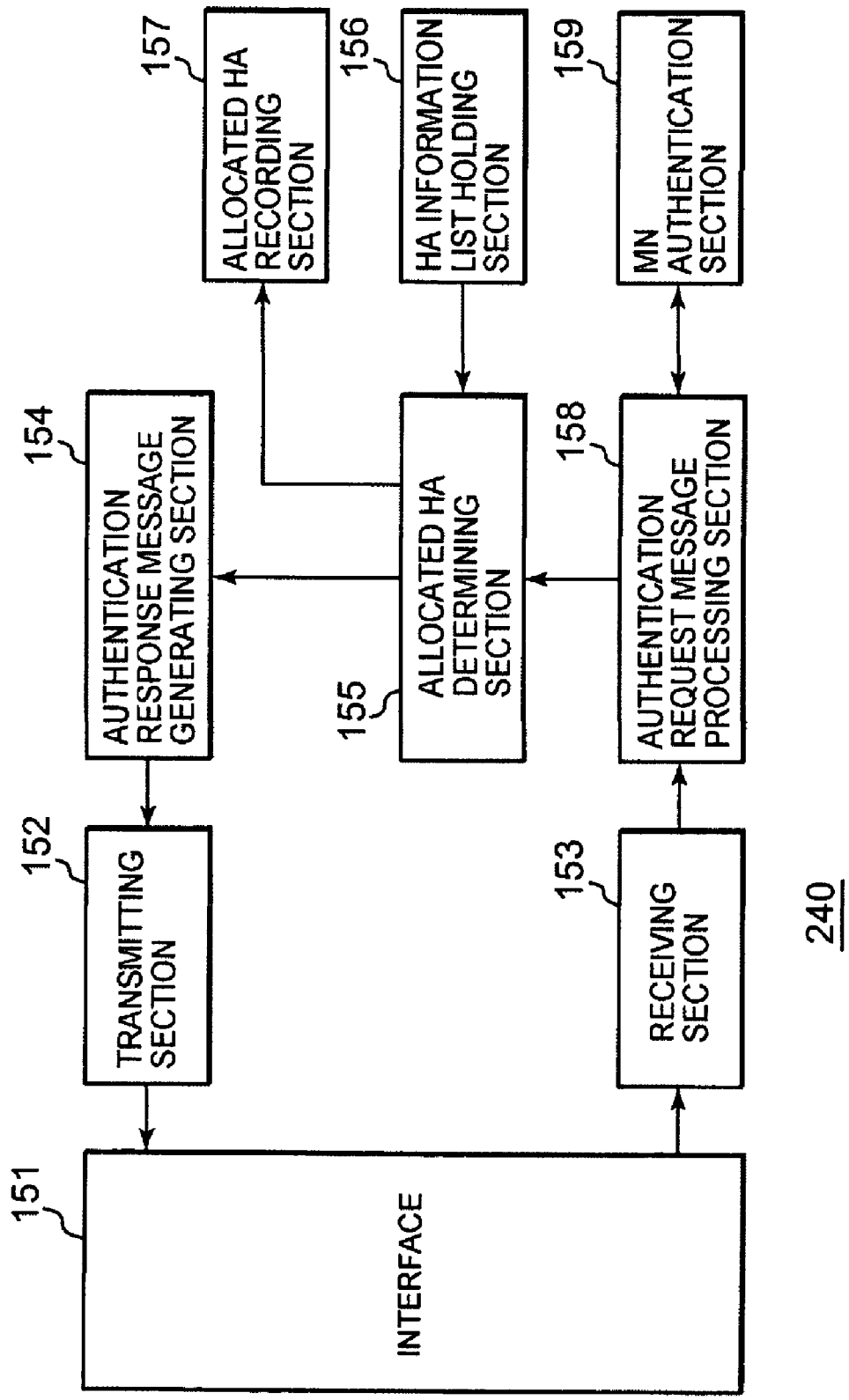
[FIG. 24] It is a block diagram showing, in detail, a configuration of an AAAH server of FIG. 21.

FIG. 24 is a configuration example of the AAAH server 240 as an HA allocation server according to the third embodiment of the present invention. The AAAH server 240 has an interface 151, a transmitting section 152, a receiving section 153, an authentication response message generating section 154, an allocated HA determining section 155, an allocated HA recording section 157, an HA information list holding section 156, an authentication request message processing section 158, and an MN authentication section 159. The authentication response message generating section 154 receives an instruction from the allocated HA determining section 155, generates the authentication response message including the passed HA information, passes it to the transmitting section 152, and instructs the transmitting section 152 to transmit it. The allocated HA determining section 155 receives an instruction from the authentication request message processing section 158, and refers to the HA information list holding section 156 to determine an HA for the MN 10 belonging to an access service provider(s) corresponding to passed one or more domain names. Further, the allocated HA determining section 155 passes the HA information to the allocated HA recording section 157 to request the allocated HA recording section 157 to record the HA information as the HA allocated to the MN 10, while the allocated HA determining section 155 passes it to and instructs the authentication response message generating section 154 to generate the authentication response message.

The HA information list holding section 156 is the same as the HA information list holding section 37 according to the first embodiment of the present invention, and the held HA information list is the same as that shown in FIG. 8 and FIG. 9. The allocated HA recording section 157 receives an instruction from the allocated HA determining section 155 to record a condition of allocation of an HA to the MN 10. The HA allocation condition may be held by the HA information list holding section 156.

The authentication request message processing section 158 processes the authentication request message 60 of the access service of the MN 10 transferred from the NAS 211 or the AAAF server 221, and passes information on the MN 10 as the requesting source included in the message 60 to the MN authentication section 159, requesting access authentication and mobility service authentication. If the results of the access authentication and the mobility service authentication are approved, information related to one or more access networks 202 to which the IF 2 of the MN 10 is connectable and included in the message 60 is passed to the allocated HA determining section 155, instructing the allocated HA determining section 155 to allocate an appropriate HA.

Further, if the location information of the MN 10 is included in the received authentication request message 60, an HA located near the MN 10 can be selected based on the location information, or both the location information and the domain name of the provider 200 can be used to select an HA, which is for the access network 202 to which the IF 2 of the MN is connectable, and is located near the MN. Further, if "Local" is specified in the received authentication request message 60, it can be determined that an HA existing in a "Local" area as seen from the location information of the MN 10 is selected, while if "Network" is specified, it can be determined that an HA existing a "Network" area as seen from the location information of the MN 10 is selected.

The MN authentication section 159 receives an instruction from the authentication request message processing section 158 to perform access authentication on the passed MN 10 in order to determine whether the access service is available to the MN 10. The result is returned to the authentication request message processing section 158. The mobility service authentication is also performed as well as the access authentication to determine whether the mobility service is available to the MN 10.

FIG. 25 shows a network communication sequence according to the third embodiment of the present invention. If determining that the access service authentication is necessary (step S21), the MN 10 transmits the authentication request message 60 to the network 201 connected (step S22). The authentication request message 60 from the MN 10 is received by the NAS 211, and after its content is converted into a specific authentication protocol, the authentication request message 60 is delivered to the AAAH server 240 (step S23). The AAAH server 240 performs both the access service authentication and the mobility service authentication on the received authentication request (step S24). If both services are approved, the AAAH server 240 searches for an HA to be allocated to the MN 10.

At this time, an HA suitable for the access network 202 included in the message 60 is searched for (step S25), and the result is transmitted by including it in an authentication response (step S26). The authentication response is delivered to the MN 10 by means of the NAS 211 (step S27).

As shown in FIG. 25, information on the allocated HA is so forwarded that the NAS 211 functions as a "DHCP Relay Agent" to receive a "DHCP Request" from the MN 10 (step S28), and upon transfer of it to the DHCP server 241 in step S29, the allocated HA information acquired from the AAAH server 240 is included and transferred. Then, the DHCP server 241 may give notification by including the address of the finally allocated HA in a "DHCP response" to the "DHCP Request" transmitted from the MN 10 and transferred from the "DHCP Relay Agent" (step S30, S31). Alternatively, the NAS 211 may include it directly in the authentication response message to be transmitted to the MN 10. The MN 10 starts IKE in order to use the allocated HA 232, generating SA and acquiring HoA (step S32).

The flow of HA selection processing by the AAAH server 240 as the HA allocation server according to the third embodiment of the present invention is almost the same as that in FIG. 20, except that the information notified by the MN 10 is the information on the access network 202 related to the IF 2 and the location information.

Note that the technique according to the third embodiment of the present invention can be employed even when the MN 10 has only the interface 11 (IF 1). In this case, information related to the access network 201 to which the interface 11 is being connected (e.g., the type of network access mechanism to the access network 201, an identifier of the access network 201: SSID, Mac address of access point, etc.) is included in the message as the information related to the interface 11 connected to the access network 201.

Further, if a network-based mobile control protocol (Proxy Mobile IPv6) is provided in the access network 202 to which the IF 2 of the MN 10 is connectable, the technique according to the third embodiment of the present invention may be so employed that the MN 10 requests use of mobile IPv6 to cause itself to perform mobile control instead of using the network-based mobile control protocol before the IF 2 is connected to the access network 202. Further, in the case of use of proxy mobile IPv6 when the IF 2 is connected to the access network 202, it may request dynamic allocation of a Local Mobility Anchor (LMA) used by proxy mobile IPv6, instead of the HA for mobile IPv6, before the IF 2 is connected to the access network 202.

In this case, allocation of an HA for mobile IPv6 may be requested in the authentication request message 60 transmitted by the MN 10, or information for specifying an LMA allocation request for the network-based mobile control protocol may be included. Further, information for requesting allocation of a node that serves as both the LMA and the HA may be included. The application is not limited to the case when newly connecting the IF 2 to the access network 202, and the above method is also applicable to a case where the IF 1 already connected to the access network 201 hands over to change the connected destination to the access network 202.

The above method is further applicable to a case where either mobile IPv6 or proxy mobile IPv6 is in use and is switched to the other on condition that the IF 2 is being connected to the access network 201. Note that, when requesting allocation of an LMA, the MN 10 may receive a notification indicative of whether the LMA has been allocated or not without the need to be notified of the address of the allocated LMA.

According to the third embodiment of the present invention, the HA and LMA selected according to the access network 202 to which the IF 2 of the MN 10 is connectable, the location information, and the information for specifying the IF 2 can be dynamically allocated. This allows the mobility service provider 200 to change the HA and the LMA to be allocated to the MN 10 according to the access network and/or the location information. Further, even if there is an interface 12 that is in no connection to the access network 202, the HA and LMA for the access network 202 to be connected can be allocated to the MN 10 as the HA and LMA used when the interface 12 is connected again to the access network 202. A route between the HA-1F2 of the MN 10 and the LMA is optimized or a QoS state or the like is considered at the time of arranging the HA and LMA and at the time of selecting the HA and LMA to be allocated, enabling more effective HA and LMA allocation.

Note that each of the functional blocks used in describing the aforementioned embodiments of the present invention is implemented as an LSI (Large Scale Integration) typified by an integrated circuit. Each of them may be made up of one chip individually, or they may be made up of one chip to include some or all of them. Here, although the LSI is assumed, it may be called an IC (Integrated Circuit), a system LSI, a super LSI, or an ultra LSI depending on the degree of integration.

Further, the technique for creation of an integrated circuit is not limited to LSI, and it may be implemented by a private circuit or a general-purpose processor. Further, an FPGA (Field Programmable Gate Array) capable of programming after LSI manufacturing or a reconfigurable processor capable of reconfiguring connections or settings of circuit cells within the LSI may be employed.

In addition, if integrated circuit technology capable of replacing LSI emerges with development of semiconductor technology or another technology derived therefrom, it is needless to say that the technology may be used to integrate the functional blocks. For example, applications of biotechnology may be possible.

INDUSTRIAL APPLICABILITY

The present invention enables a mobility service provider to allocate a home agent appropriate for each individual mobile node, and hence to prevent a route between the mobile node and the home agent from becoming long and taking a long detour, making it available for mobility networks.

The invention claimed is:

1. A communication system having one or more home agents provided in a first provider providing a mobility service and a home agent allocation server provided in the first provider, and causing a mobile node to acquire a home address from a home agent, the communication system comprising:
a section that causes the home agent allocation server to hold, in advance, correspondences between the one or more home agents and a second provider providing an access service;
a section that causes the mobile node which is connected only to the second provider to transmit, to an address of the home agent allocation server, a home agent allocation request message including identification information of the second provider to which the mobile node is currently connected; and
a section that causes the home agent allocation server to select a home agent based on the held correspondences between the one or more home agents and the second provider in response to the home agent allocation request message including the identification information of the second provider and transmit a notification of the selected home agent to the mobile node,
wherein the mobile node acquires a home address from the selected home agent.

2. A communication system having one or more home agents provided in a first provider providing a mobilit service and a home agent allocation server provided in the first provider or a second provider providing an access service, and causing a mobile node to acquire a home address from a home agent, the communication system comprising:
a section that causes the home agent allocation server to hold, in advance, correspondences between the one or more home agents and the second provider;
a section that causes the mobile node to transmit, to an address of the home agent allocation server, a home agent allocation request message including identification information of the second provider; and
a section that causes the home agent allocation server to select a home agent based on the held correspondences between the one or more home agents and the second provider in response to the home agent allocation request message including the identification information of the second provider and to transmit a notification of the selected home agent to the mobile node,
wherein the mobile node acquires a home address from the selected home agent, and the communication system is characterized in that the communication system further comprises:
a section that causes the mobile node to transmit identification information of the first provider to the second provider; and
a section that causes the second provider to transmit, to the mobile node, an address of the home agent allocation server in response to the transmitted identification information of the first provider.

3. A mobile node in a communication system having one or more home agents provided in a first provider providing a mobility service and a home agent allocation server provided in the first provider, and causing the mobile node to acquire a home address from a home agent, in which the home agent allocation server holds, in advance, correspondences between the one or more home agents and a second provider providing an access service, the mobile node being connected only to the second provider and the mobile node comprising:
a transmission section that transmits, to an address of the home agent allocation server, a home agent allocation request message including identification information of the second provider to which the mobile node is currently connected; and
an acquisition section that acquires a home address from a home agent when the home agent allocation server selects the home agent based on the held correspondences between the one or more home agents and the service provider in response to the home agent allocation request message including the identification information of the second provider and transmits a notification of the selected home agent to the mobile node.

4. A mobile node in a communication system having one or more home agents provided in a first provider providing a mobility service and a home agent allocation server provided in the first provider or a second provider providing an access service, and causing the mobile node to acquire a home address from a home agent, in which the home agent allocation server holds, in advance, correspondences between the one or more home agents and a second provider, the mobile node comprising;
a transmission section that transmits, to an address of the home agent allocation server, a home agent allocation request message including identification information of the second provider; and
an acquisition section that acquires a home address from a home agent when the home agent allocation server selects the home agent based on the held correspondences between the one or more home agents and the service provider in response to the home agent allocation request message including the identification information of the second provider and transmits a notification of the selected home agent to the mobile node,
wherein the communication system comprises a notification section that transmits identification information of the first provider to the second provider,
wherein when the second provider notifies the mobile node of the address of the home agent allocation server in response to the transmitted identification information of the first provider, the home agent allocation request message including the identification information of the second provider is transmitted to the notified address of the home agent allocation server.

5. A communication system having one or more home agents provided in a first provider providing a mobility service and a home agent allocation server provided in the first provider or a second provider providing an access service, and causing a mobile node to acquire a home address from a home agent, the communication system comprising:
a section that causes the home agent allocation server to hold, in advance correspondences between the one or more home agents and the second provider;

a section that causes the mobile node to transmit, to an address of the home agent allocation server, a home agent allocation request message including identification information of the second provider; and a section that causes the home agent allocation server to select a home agent based on the held correspondences between the one or more home agents and the second provider in response to the home agent allocation request message including the identification information of the second provider and transmit a notification of the selected home agent to the mobile node, wherein the mobile node acquires a home address from the selected home agent, and the communication system is characterized in that the home agent allocation server further holds, in advance, correspondences among the one or more home agents, the second provider, and areas, the home agent allocation request message transmitted to the address of the home agent allocation server further includes location information of the mobile node, and the home agent allocation server selects the home agent based on the held correspondences among the one or more home agents, the second provider, and the areas in response to the home agent allocation request message including the location information, and transmits the notification of the selected home agent to the mobile node.

6. The communication system according to claim 1, characterized in that the identification information is a domain name.

7. A mobile node in a communication system having one or more home agents provided in a first provider providing a mobility service and a home agent allocation server provided in the first provider or a second provider providing an access service, and causing the mobile node to acquire a home address from a home agent, in which the home agent allocation server holds in advance correspondences between the one or more home agents and a second provider, the mobile node comprising:

a transmission section that transmits, to an address of the home agent allocation server, a home agent allocation request message including identification information of the second provider; and an acquisition section that acquires a home address from a home agent when the home agent allocation server selects the home agent based on the held correspondences between the one or more home agents and the service provider in response to the home agent allocation request message including the identification information of the second provider and transmits a notification of the selected home agent to the mobile node, the mobile node characterized in that the home agent allocation server further holds, in advance, correspondences among the one or more home agents, the second provider, and areas, and the home agent allocation request message transmitted to the address of the home agent allocation server further includes location information of the mobile node, and when the second provider corresponding to an unconnectable interface becomes connectable after the home agent allocation server selects the home agent of the second provider corresponding to the unconnectable interface based on the held correspondences among the one or more home agents, the second provider, and the areas in response to the home agent allocation request message including the location information, and notifies the mobile node of the selected home agent, a home address is acquired from the selected home agent.

8. The mobile node according to claim 3, characterized in that the identification information is a domain name.

* * * * *